US009401936B2

(12) United States Patent
Kanda et al.

(10) Patent No.: US 9,401,936 B2
(45) Date of Patent: *Jul. 26, 2016

(54) COMMUNICATION MANAGEMENT SYSTEM, COMMUNICATION MANAGEMENT METHOD, AND COMPUTER PROGRAM PRODUCT

(71) Applicant: RICOH COMPANY, LTD., Tokyo (JP)

(72) Inventors: Hiroyuki Kanda, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,943

(22) Filed: Aug. 17, 2015

(65) Prior Publication Data

US 2015/0358369 A1 Dec. 10, 2015

Related U.S. Application Data

(63) Continuation of application No. 14/183,859, filed on Feb. 19, 2014.

(30) Foreign Application Priority Data

Feb. 28, 2013 (JP) .................................. 2013-039707

(51) Int. Cl.
*H04L 12/18* (2006.01)
*H04L 12/16* (2006.01)
(Continued)

(52) U.S. Cl.
CPC ........ *H04L 65/1093* (2013.01); *H04L 65/4046* (2013.01); *H04L 65/605* (2013.01);
(Continued)

(58) Field of Classification Search
USPC ............. 370/260–261, 266; 379/202.01, 158; 709/204
See application file for complete search history.

(56) References Cited

U.S. PATENT DOCUMENTS 5,589,873 A    12/1996   Natori et al.
5,973,724 A * 10/1999   Riddle ................ H04L 12/1822
                                                                                                                       348/14.07
(Continued)

FOREIGN PATENT DOCUMENTS

JP           3128680        11/2000
JP        2008-227577       9/2008

(Continued)

OTHER PUBLICATIONS

U.S. Office Action mailed Dec. 3, 2015, in co-pending U.S. Appl. No. 14/183,859.

*Primary Examiner* — Wutchung Chu
(74) *Attorney, Agent, or Firm* — Oblon, McClelland, Maier & Neustadt, L.L.P.

(57) ABSTRACT

A communication management system manages communication terminals transmitting and receiving communication data. The system includes a session management unit configured to manage session identifying information and terminal identifying information in an associated manner, the session identifying information being used to identify a communication session being performed among a plurality of communication terminals and the terminal identifying information being used to identify each of the communication terminals; a receiving unit configured to receive, from a conversion system, terminal identifying information about a communication terminal that is being in communication, the conversion system mutually converting a communication scheme of communication data transmitted from one communication terminal and a communication scheme of communication data transmitted from another communication terminal; and a transmitting unit configured to transmit, to the conversion system, session identifying information that is associated with the received terminal identifying information in the session management unit.

21 Claims, 18 Drawing Sheets

(51) Int. Cl.
*H04M 3/56* (2006.01)
*H04L 29/06* (2006.01)
*H04N 7/14* (2006.01)
*H04W 4/16* (2009.01)
*H04N 19/52* (2014.01)
*H04N 7/15* (2006.01)

(52) U.S. Cl.
CPC .............. *H04L 65/80* (2013.01); *H04N 7/148* (2013.01); *H04N 7/15* (2013.01); *H04N 19/52* (2014.11); *H04W 4/16* (2013.01); *H04L 12/1822* (2013.01)

(56) References Cited

U.S. PATENT DOCUMENTS

| | | | | |
|---|---|---|---|---|
| 8,113,148 B2* | 2/2012 | Chem | ................... | A01K 1/033 119/482 |
| 8,472,354 B2* | 6/2013 | Gillipalli | ............ | H04M 3/4288 370/261 |
| 8,730,847 B1* | 5/2014 | Carino | ................ | H04L 12/1818 370/260 |
| 2003/0103492 A1* | 6/2003 | Tanimoto | ............ | H04L 12/5692 370/351 |
| 2005/0057125 A1 | 3/2005 | Yingst | | |
| 2005/0058125 A1* | 3/2005 | Mutikainen | ....... | H04L 29/12292 370/354 |
| 2006/0190727 A1* | 8/2006 | Berndt | ................. | H04L 63/123 713/168 |
| 2006/0250987 A1* | 11/2006 | White | ............... | H04M 3/42382 370/260 |
| 2007/0092070 A1* | 4/2007 | Croy | ................. | H04M 3/42348 379/45 |
| 2007/0156924 A1* | 7/2007 | Ramalingam | ....... | H04L 12/1822 709/246 |
| 2008/0192770 A1* | 8/2008 | Burrows | ................ | H04L 65/104 370/466 |
| 2009/0207905 A1* | 8/2009 | Tomita | .............. | H04L 29/12066 375/240.01 |
| 2010/0217887 A1* | 8/2010 | Bouazizi | ................ | H04L 1/0041 709/231 |
| 2011/0314099 A1* | 12/2011 | Imai | .................... | H04L 12/1822 709/204 |
| 2012/0221702 A1* | 8/2012 | Umehara | ............ | H04L 12/1818 709/223 |
| 2013/0077539 A1* | 3/2013 | Averill | ................ | H04L 12/1818 370/261 |
| 2013/0106989 A1* | 5/2013 | Gage | ...................... | H04N 7/152 348/14.09 |
| 2013/0136116 A1* | 5/2013 | Viswanathan | ........ | H04W 76/02 370/338 |
| 2013/0151623 A1* | 6/2013 | Weiser | ..................... | H04N 7/14 709/205 |
| 2013/0152153 A1* | 6/2013 | Weiser | ................ | H04L 63/0236 726/1 |
| 2013/0166718 A1* | 6/2013 | Okuyama | .............. | H04L 67/24 709/223 |
| 2013/0282803 A1* | 10/2013 | Boyer | .................... | H04N 7/152 709/204 |
| 2013/0298031 A1 | 11/2013 | Kanda et al. | | |
| 2014/0143434 A1* | 5/2014 | Sanche | ............... | H04L 65/1073 709/228 |
| 2014/0244755 A1 | 8/2014 | Kanda et al. | | |
| 2014/0244756 A1 | 8/2014 | Kanda et al. | | |
| 2014/0362739 A1* | 12/2014 | Wang | ................. | H04L 12/1818 370/260 |

FOREIGN PATENT DOCUMENTS

| | | |
|---|---|---|
| JP | 2012-191598 | 10/2012 |
| JP | 2013-153419 | 8/2013 |

* cited by examiner

LOW RESOLUTION

MEDIUM RESOLUTION

HIGH RESOLUTION

FIG.10

QUALITY CHANGE MANAGEMENT TABLE

| IP ADDRESS OF RELAY DESTINATION TERMINAL | IMAGE QUALITY OF IMAGE DATA TO BE RELAYED (IMAGE QUALITY OF IMAGE) |
|---|---|
| 1.3.1.4 | HIGH IMAGE QUALITY |
| 1.3.1.3 | HIGH IMAGE QUALITY |
| 1.2.2.3 | MEDIUM IMAGE QUALITY |
| ... | ... |

FIG.11

RELAYING APPARATUS MANAGEMENT TABLE

| RELAYING APPARATUS ID | OPERATION STATE | RECEIVING DATE | IP ADDRESS OF RELAYING APPARATUS | MAXIMUM DATA SPEED IN TELEPHONE CONVERSATION [Mbps] |
|---|---|---|---|---|
| 111a | ONLINE | 2011.11.10.13:00 | 1.2.1.2 | 100 |
| 111b | ONLINE | 2011.11.10.13:10 | 1.2.2.2 | 1000 |
| 111c | OFFLINE | 2011.11.10.13:20 | 1.3.1.2 | 10 |

FIG.12

TERMINAL INFORMATION MANAGEMENT TABLE

| TERMINAL ID | PASSWORD | MODEL NUMBER | SERIAL NUMBER | COMMUNICATION SCHEME | IP ADDRESS |
|---|---|---|---|---|---|
| 01aa | aaaa | 9001 | 2001 | DEDICATED | |
| 01ab | abab | 9001 | 2002 | DEDICATED | |
| 01ac | acac | 9001 | 2003 | DEDICATED | |
| ... | ... | ... | ... | ... | |
| 01da | dada | 8001 | 1001 | NON-DEDICATED 1 | 1.3.2.3 |
| 01db | dbdb | 8001 | 1002 | NON-DEDICATED 2 | 1.3.2.4 |
| 01dc | dcdc | 8001 | 1003 | NON-DEDICATED 1 | 1.3.2.5 |
| ... | ... | ... | ... | ... | ... |

FIG. 13

TERMINAL STATE MANAGEMENT TABLE

| TERMINAL ID | TERMINAL NAME | OPERATION STATE | RECEIVING DATE | IP ADDRESS OF TERMINAL |
|---|---|---|---|---|
| 01aa | TERMINAL AA, TOKYO BUSINESS OFFICE, JAPAN | ONLINE (READY FOR MAKING TELEPHONE CONVERSATION) | 2011.11.10. 13:40 | 1.2.1.3 |
| 01ab | TERMINAL AB, TOKYO BUSINESS OFFICE, JAPAN | OFFLINE | 2011.11.09. 12:00 | 1.2.1.4 |
| ... | ... | ... | ... | ... |
| 01ba | TERMINAL BA, OSAKA BUSINESS OFFICE, JAPAN | ONLINE (TEMPORARY HALT) | 2011.11.10. 13:45 | 1.2.2.3 |
| 01bb | TERMINAL BB, OSAKA BUSINESS OFFICE, JAPAN | ONLINE (READY FOR MAKING TELEPHONE CONVERSATION) | 2011.11.10. 13:50 | 1.2.2.4 |
| ... | ... | ... | ... | ... |
| 01ca | TERMINAL CA, NEW YORK BUSINESS OFFICE IN USA | ONLINE (READY FOR MAKING TELEPHONE CONVERSATION) | 2011.11.10. 12:45 | 1.3.1.3 |
| 01cb | TERMINAL CB, NEW YORK BUSINESS OFFICE IN USA | ONLINE (BUSY) | 2011.11.10. 13:55 | 1.3.1.4 |
| ... | ... | ... | ... | ... |
| 01da | TERMINAL DA, WASHINGTON BUSINESS OFFICE IN USA | | | |
| 01db | TERMINAL DB, WASHINGTON BUSINESS OFFICE IN USA | | | |
| ... | ... | | | |

FIG.14

DESTINATION LIST MANAGEMENT TABLE

| REQUESTER TERMINAL ID | DESTINATION TERMINAL ID |
|---|---|
| 01aa | 01ab, ···, 01ba, 01bb, ···, 01ca, 01cb, 01da, 01db |
| ... | ... |
| 01ba | 01aa, 01ab, 01ca, 01cb, 01da, 01db |
| ... | ... |
| 01ca | 01aa, 01ab, 01ba, ···, 01da |
| ... | ... |
| 01da | 01aa, ··· |
| ... | ... |

FIG.15

SESSION MANAGEMENT TABLE

| SESSION ID | RELAYING APPARATUS ID | REQUESTER TERMINAL ID | DESTINATION TERMINAL ID | DELAY TIME [ms] | DELAY TIME INFORMATION RECEIVING DATE |
|---|---|---|---|---|---|
| se01 | 111a | 01aa | 01ca | 200 | 2011.11.10.14:00 |
| se02 | 111b | 01ba | 01cb | 50 | 2011.11.10.14:10 |
| se03 | 111c | 01bb | 01cc | 400 | 2011.11.10.14:20 |
| ... | ... | ... | ... | ... | ... |

FIG.16

CONVERSION MANAGEMENT TABLE

| TERMINAL ID OF NON-DEDICATED TERMINAL | IP ADDRESS OF CONVERSION SYSTEM | IP ADDRESS OF NON-DEDICATED TERMINAL |
|---|---|---|
| 01da | 1.3.2.2 | 1.3.2.3 |
| 01db | 1.3.2.2 | 1.3.2.4 |
| 01dc | 1.3.2.2 | 1.3.2.5 |
| … | … | … |

FIG.17

QUALITY MANAGEMENT TABLE

| RELAY TIME [ms] | IMAGE QUALITY OF IMAGE DATA (QUALITY OF IMAGE) |
|---|---|
| 0 TO 100 | HIGH IMAGE QUALITY |
| 100 TO 300 | MEDIUM IMAGE QUALITY |
| 300 TO 500 | LOW IMAGE QUALITY |
| 500 TO | (HALT) |

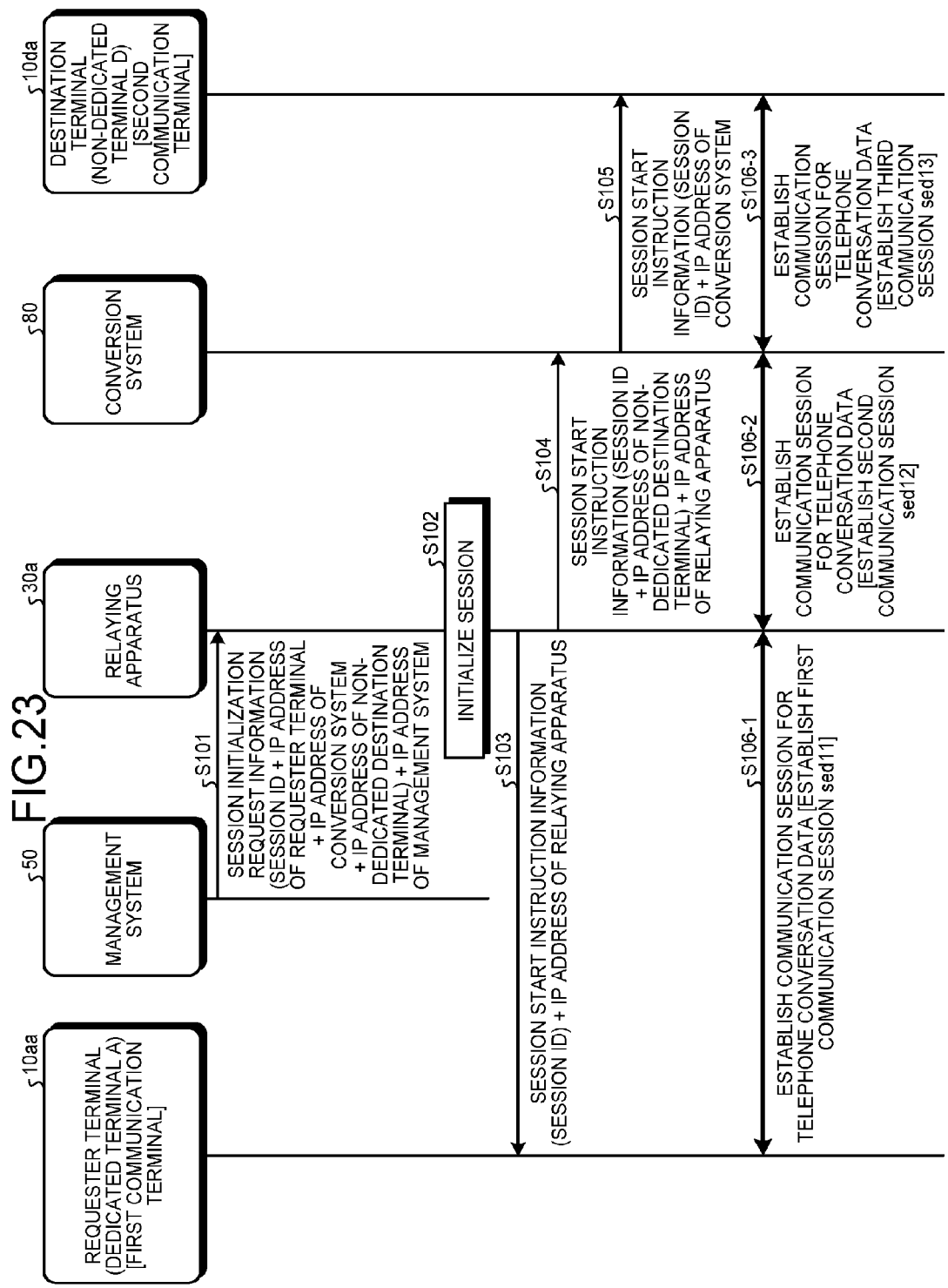

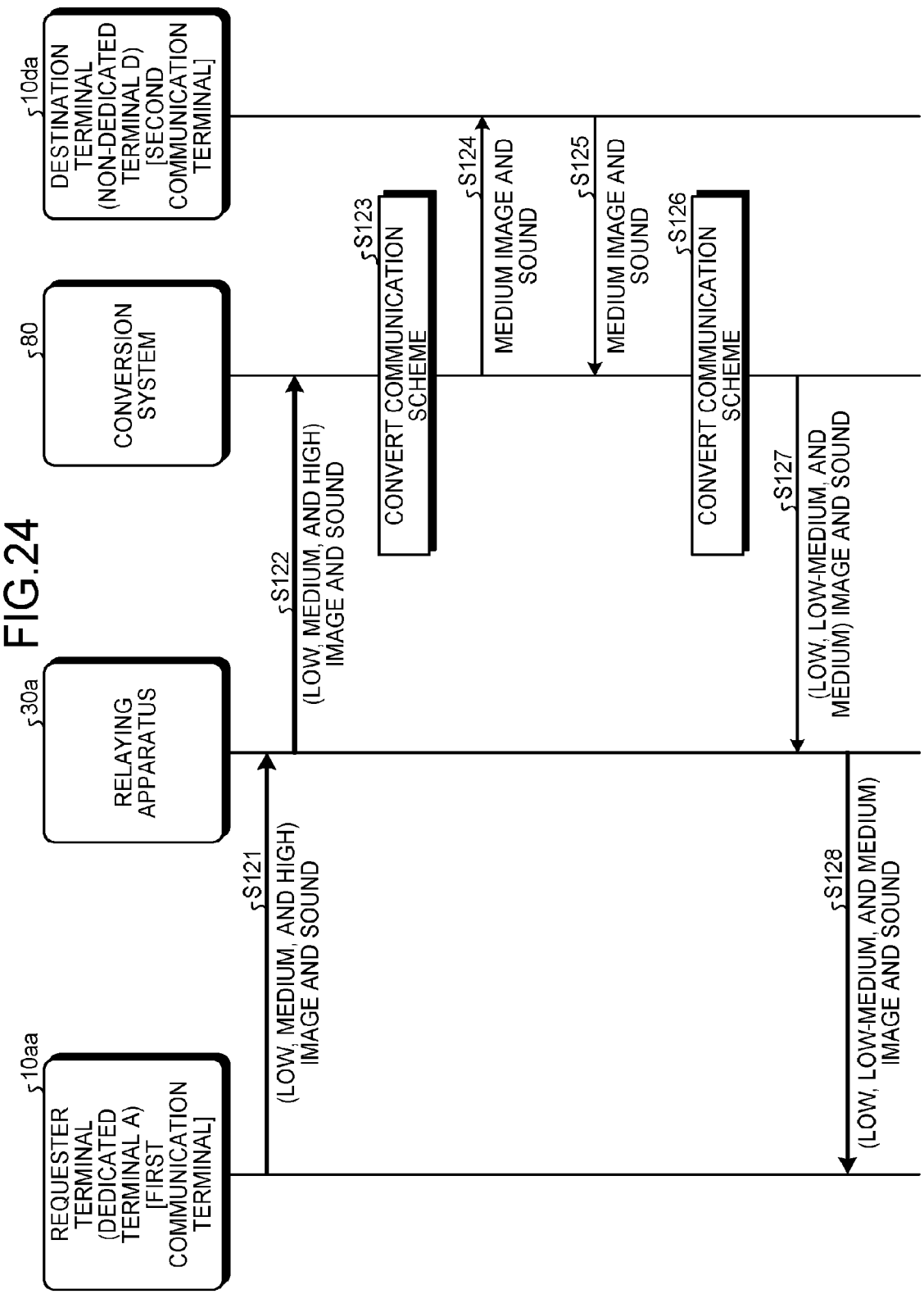

COMMUNICATION MANAGEMENT SYSTEM, COMMUNICATION MANAGEMENT METHOD, AND COMPUTER PROGRAM PRODUCT

CROSS-REFERENCE TO RELATED APPLICATIONS

The present application is a continuation application of and claims the benefit of priority under 35 U.S.C. §120 from U.S. application Ser. No. 14/183,859, filed Feb. 19, 2014, which is based upon and claims the benefit of priority under 35 U.S.C. §119 from Japanese Patent Application No. 2013-039707 filed in Japan on Feb. 28, 2013, the entire contents of both of which are incorporated herein by reference.

BACKGROUND OF THE INVENTION

1. Field of the Invention

The present invention relates to management of a communication terminal that transmits and receives certain communication data.

2. Description of the Related Art

With the recent demand to reduce the cost of business trips and the time they take, telephone conversation systems that operate over communication networks, such as the Internet, have become widely used to hold teleconferences. An example of such a telephone conversation system is where a teleconference can be achieved by transmitting and receiving image data and sound data among a plurality of telephone conversation terminals (refer to Japanese Patent Application Laid-open No. 2008-227577).

In another telephone conversation system, even when two or more telephone conversation terminals are communicating with each other, a third telephone conversation terminal, which is different from the two or more telephone conversation terminals, can join them (refer to Japanese Patent Application Laid-open No. 2012-191598).

However, if the communication scheme of the third telephone communication terminal, which tries to join the communication, is different from the communication scheme of the other two or more telephone communication terminals, the third telephone communication terminal cannot join the communication.

SUMMARY OF THE INVENTION

There is a need to at least partially solve the problems in the conventional technology.

According to an aspect of the present invention, there is provided a communication management system that manages communication terminals transmitting and receiving communication data. The communication management system includes a session management unit configured to manage session identifying information and terminal identifying information in an associated manner, the session identifying information being used to identify a communication session being performed among a plurality of communication terminals and the terminal identifying information being used to identify each of the plurality of communication terminals among which the communication session is being performed; a receiving unit configured to receive, from a conversion system, terminal identifying information about a communication terminal that is being in communication, wherein the conversion system mutually converts a communication scheme of communication data transmitted from one communication terminal and a communication scheme of communication data transmitted from another communication terminal; and a transmitting unit configured to transmit, to the conversion system, session identifying information that is associated with the terminal identifying information received by the receiving unit in the session management unit.

According to another aspect of the present invention, there is provided a communication management method that is performed by a communication management system that includes a session management unit configured to manage session identifying information and terminal identifying information in an associated manner, the session identifying information being used to identify a communication session being performed among a plurality of communication terminals and the terminal identifying information being used to identify each of the plurality of communication terminals among which the communication session is being performed. The communication management method includes receiving, from a conversion system, terminal identifying information about a communication terminal that is being in communication, wherein the conversion system mutually converts a communication scheme of communication data transmitted from one communication terminal and a communication scheme of communication data transmitted from another communication terminal; reading, from the session management unit, session identifying information that is associated with the terminal identifying information received; and transmitting, to the conversion system, the session identifying information read.

According to still another aspect of the present invention, there is provided a non-transitory computer-readable medium that contains a computer program that, when executed by a communication management system that includes a session management unit configured to manage session identifying information and terminal identifying information in an associated manner, the session identifying information being used to identify a communication session being performed among a plurality of communication terminals and the terminal identifying information being used to identify each of the plurality of communication terminals among which the communication session is being performed, cause the communication management system to perform a method including: receiving, from a conversion system, terminal identifying information about a communication terminal that is being in communication, wherein the conversion system mutually converts a communication scheme of communication data transmitted from one communication terminal and a communication scheme of communication data transmitted from another communication terminal; reading, from the session management unit, session identifying information that is associated with the terminal identifying information received; and transmitting, to the conversion system, the session identifying information read.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a conceptual diagram illustrating a quality change management table;

FIG. 11 is a conceptual diagram illustrating a relaying apparatus management table;

FIG. 12 is a conceptual diagram illustrating a terminal information management table;

FIG. 13 is a conceptual diagram illustrating a terminal state management table;

FIG. 14 is a conceptual view illustrating a destination list management table;

FIG. 15 is a conceptual diagram illustrating a session management table;

FIG. 16 is a conceptual diagram illustrating a conversion management table;

FIG. 17 is a conceptual diagram illustrating a quality management table;

FIG. 23 is a sequence diagram illustrating processing to establish the communication session before a telephone conversation is made between the dedicated terminal and a non-dedicated terminal;

FIG. 24 is a sequence diagram illustrating processing in which the telephone conversation data is transmitted and received between the dedicated terminal and the non-dedicated terminal;

DETAILED DESCRIPTION OF THE PREFERRED EMBODIMENT

Exemplary embodiments of the present invention are described below with reference to the accompanying drawings.

Figure 1:
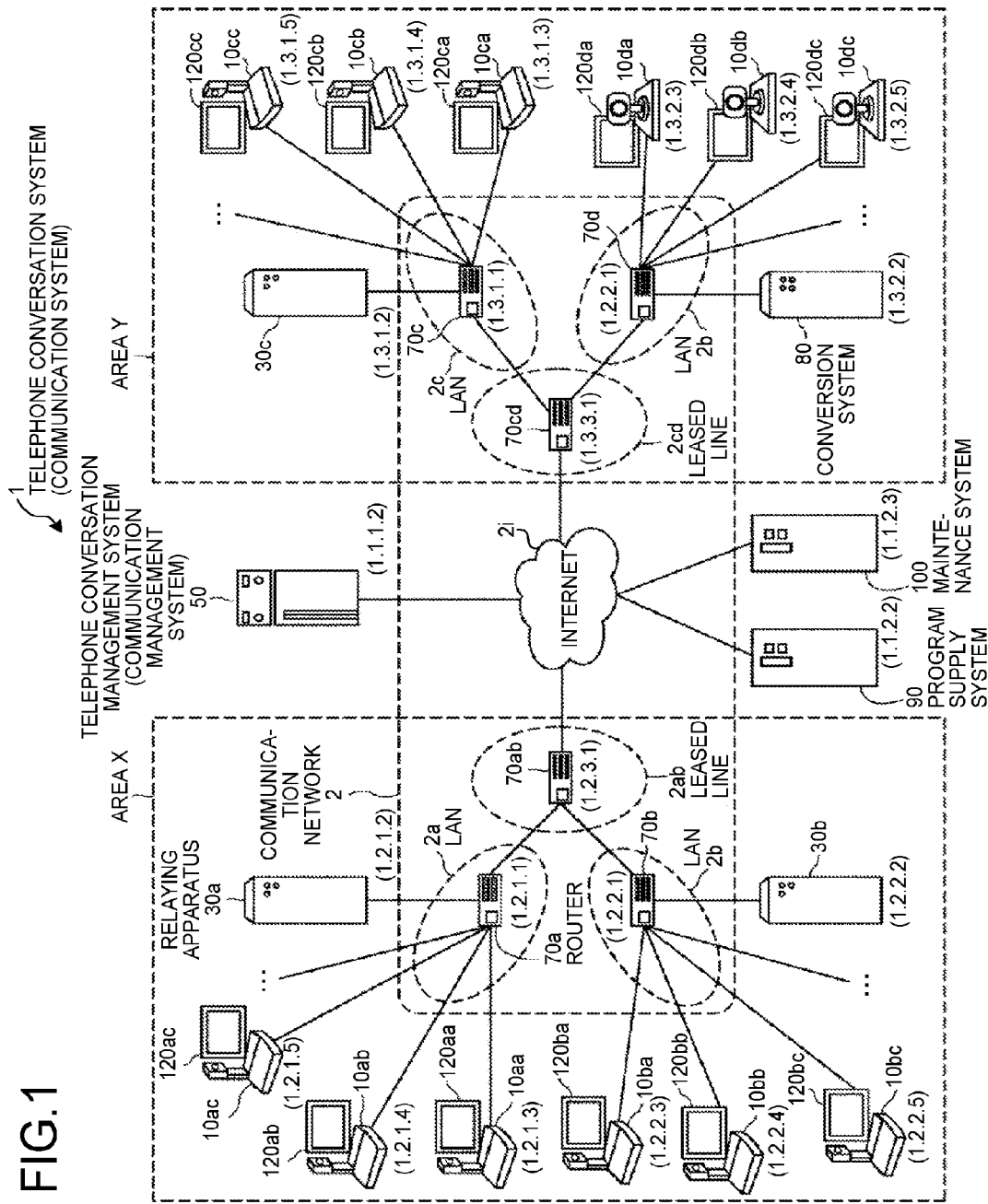
FIG. 1 is a schematic diagram of a telephone conversation system according to an embodiment of the invention.

FIG. 1 is a schematic diagram of a telephone conversation system 1 according to an embodiment. As illustrated in FIG. 1, the telephone conversation system 1 includes a plurality of telephone conversation terminals (10aa, 10ab, etc.), displays (120aa, 120ab, etc.) for the respective telephone conversation terminals (10aa, 10ab, etc.), a plurality of relaying apparatuses (30a, 30b, and 30c), a telephone conversation management system 50, a conversion system 80, a program supply system 90, and a maintenance system 100. The telephone conversation system 1 can achieve a teleconference between remote locations by communication of image data and sound data, which are examples of telephone conversation data. A plurality of routers (70a, 70b, 70c, 70d, 70ab, and 70cd) select an optimal route for the telephone conversation data.

The telephone conversation terminals (10aa, 10ab, 10ac, etc.), the relaying apparatus 30a, and the router 70a are connected to each other with a LAN 2a so as to enable communication among them. The telephone conversation terminals (10ba, 10bb, 10bc, etc.), the relaying apparatus 30b, and the router 70b are connected to each other with a LAN 2b so as to enable communication among them. The LANs 2a and 2b are connected to each other with a leased line 2ab including the router 70ab so as to enable communication therebetween. The LANs 2a and 2b and the leased line 2ab are located in a certain area X. For example, the area X is any area in Japan and the LAN 2a is located in a business office in Tokyo while the LAN 2b is located in a business office in Osaka.

The telephone conversation terminals (10ca, 10cb, 10cc, etc.), the relaying apparatus 30c, and the router 70c are connected to each other with a LAN 2c so as to enable communication among them. The telephone conversation terminals (10da, 10db, 10dc, etc.), the conversion system 80, and the router 70d are connected to each other with a LAN 2d so as to enable communication among them. The LANs 2c and 2d are connected to each other with a leased line 2cd including the router 70cd so as to enable communication therebetween. The LANs 2c and 2d and the leased line 2cd are located in a certain area Y. For example, the area Y is any area in the United States of America and the LAN 2c is located in a business office in New York while the LAN 2d is located in a business office in Washington, D.C. The areas X and Y are connected to each other with the routers (70ab and 70cd) through the Internet 2i so as to enable communication therebetween.

Hereinafter, the "telephone conversation terminal" is simply expressed as the "terminal" while the "telephone conversation management system" is simply expressed as the "management system". An arbitrary terminal in the terminals (10aa, 10ab, etc.) is referred to as the "terminal 10". An arbitrary display in the displays (120aa, 120ab, etc.) is referred to as the "display 120". An arbitrary relaying apparatus in the relaying apparatuses (30a, 30b, and 30c) is referred to as the "relaying apparatus 30". A terminal that requests a start of a teleconference is expressed as a "requester terminal" and another terminal that is a destination of the request (relay destination) is described as a "destination terminal". An arbitrary router in the routers (70a, 70b, 70c, 70d, 70ab, and 70cd) is referred to as the "router 70".

The management system 50, the program supply system 90, and the maintenance system 100 are connected to the Internet 2i. In the embodiment, the conversion system 80 is connected to the router 70d in the LAN 2d in the area Y. The management system 50, the program supply system 90, and the maintenance system 100 may be disposed in the area X or the area Y, or in any area other than the areas X and Y.

In the embodiment, the communication network 2 includes the LANs 2*a* and 2*b*, the leased lines 2*ab* and 2*cd*, the Internet 2*i*, and the LANs 2*c* and 2*d*. The communication network 2 may include a section in which communication is performed wirelessly such as WiFi (Wireless Fidelity) or Bluetooth (registered trademark) besides the wired transmission.

Each of the terminal 10, the relaying apparatus 30, the management system 50, the router 70, the conversion system 80, the program supply system 90, and the maintenance system 100 illustrated in FIG. 1 has a number of four digits attached at the bottom. These numbers represent commonly used IP addresses in IPv4 in a simple manner. For example, the IP address of the terminal 10*aa* is "1.2.1.3". The IP address may be expressed in IPv6 instead of IPv4. However, the explanation is made using IPv4 for simple explanation.

The terminals 10 may be used together in a telephone conversation made in the same room, or in a telephone conversation made between an outdoor site and an indoor site or among the outdoor sites in addition to a telephone conversation made among a plurality of business offices and a telephone conversation made among different rooms in the same business office. When the terminals 10 are used at an outdoor site, communication is performed wirelessly using a mobile phone communication network, for example.

Each terminal 10 illustrated in FIG. 1 enables a user to have a telephone conversation by transmitting and receiving telephone conversation data. The terminal 10 is a teleconference terminal, for example. In addition, the terminal 10 transmits and receives the telephone conversation data using a certain communication scheme (a call control scheme to connect or disconnect to a destination of a telephone conversation and a coding scheme to convert the telephone conversation data to an Internet protocol (IP) packet).

Examples of the call control scheme include protocols such as (1) a session initiation protocol (SIP), (2) H.323, (3) an extended SIP, (4) a protocol of an instant messenger, (5) a protocol using a message method of the SIP, (6) a protocol of internet relay chat (IRC), and (7) an extended version of the protocol of the instant messenger. The protocol of the instant messenger is used in (4-1) an extensible messaging presence protocol (XMPP) or (4-2) ICQ (registered trademark), AIM (registered trademark), or Skype (registered trademark), for example. The extended version of the protocol of the instant messenger is Jingle, for example.

Of the terminals 10, a terminal 10 is expressed as a "dedicated terminal A" that uses a communication scheme in which the call control scheme is the protocol of the instant messenger (or the extended version of the protocol of the instant messenger) and the coding scheme is scalable video coding (SVC), for example. Of the terminals 10, a terminal 10 is expressed as a "non-dedicated terminal D" that uses another communication scheme in which at least one of the call control scheme and the coding scheme differs from those of the dedicated terminal A. In the embodiment, as an example of two terminals using different communication schemes, the "dedicated terminal A" is described as a terminal manufactured, sold, or managed by a specific company while the "non-dedicated terminal D" is described as a terminal manufactured, sold, or managed by a company other than the specific company. The reason for using the above mentioned example in the embodiment is that terminals manufactured, sold, or managed by different companies use different communication schemes in many cases. As an alternative example of the two terminals using different communication schemes, a new terminal may be defined as the "dedicated terminal A" while an old terminal may be defined as the "non-dedicated terminal D" in terms of the manufactured dates or sold dates of terminals manufactured or sold by an identical company.

Each relaying apparatus 30 is a computer system that relays the telephone conversation data between two or more terminals of the terminals 10. The management system 50 performs login authentication of the terminal 10 and manages a telephone conversation state of the terminal 10, a destination list, and a communication state of the relaying apparatus 30 in an integrated fashion, for example. Images represented by the image data may be moving images or still images, or both moving and still images.

The conversion system 80 plays roles of a signaling gateway that converts a call control signal and a video/audio gateway that encodes the telephone conversation data. The conversion system 80 is a gateway that mutually converts the communication scheme of the telephone conversation data transmitted from the requester terminal and the communication scheme (the call control scheme and the coding scheme) of the telephone conversation data transmitted from the destination terminal, and converts at least one of the call control scheme and the coding scheme.

The program supply system 90 is a computer system that provides programs used in the respective ones of the terminal 10, the relaying apparatus 30, the management system 50, the conversion system 80, and the maintenance system 100 to the respective ones through the communication network 2.

The maintenance system 100 is a computer system that performs maintenance management or maintenance of at least one of the terminal 10, the relaying apparatus 30, the management system 50, the conversion system 80, and the program supply system 90. For example, when the maintenance system 100 is installed domestically while the terminal 10, the relaying apparatus 30, the management system 50, the conversion system 80, or the program supply system 90 is installed overseas, the maintenance system 100 remotely performs the maintenance management or the maintenance of at least one of the terminal 10, the relaying apparatus 30, the management system 50, the conversion system 80, and the program supply system 90 through the communication network 2. The maintenance system 100 also performs the maintenance, such as the management of a model number, a product serial number, a sales destination, maintenance and inspection, or a failure history, of at least one of the terminal 10, the relaying apparatus 30, the management system 50, the conversion system 80, and the program supply system 90 without using the communication network 2.

Figure 2:
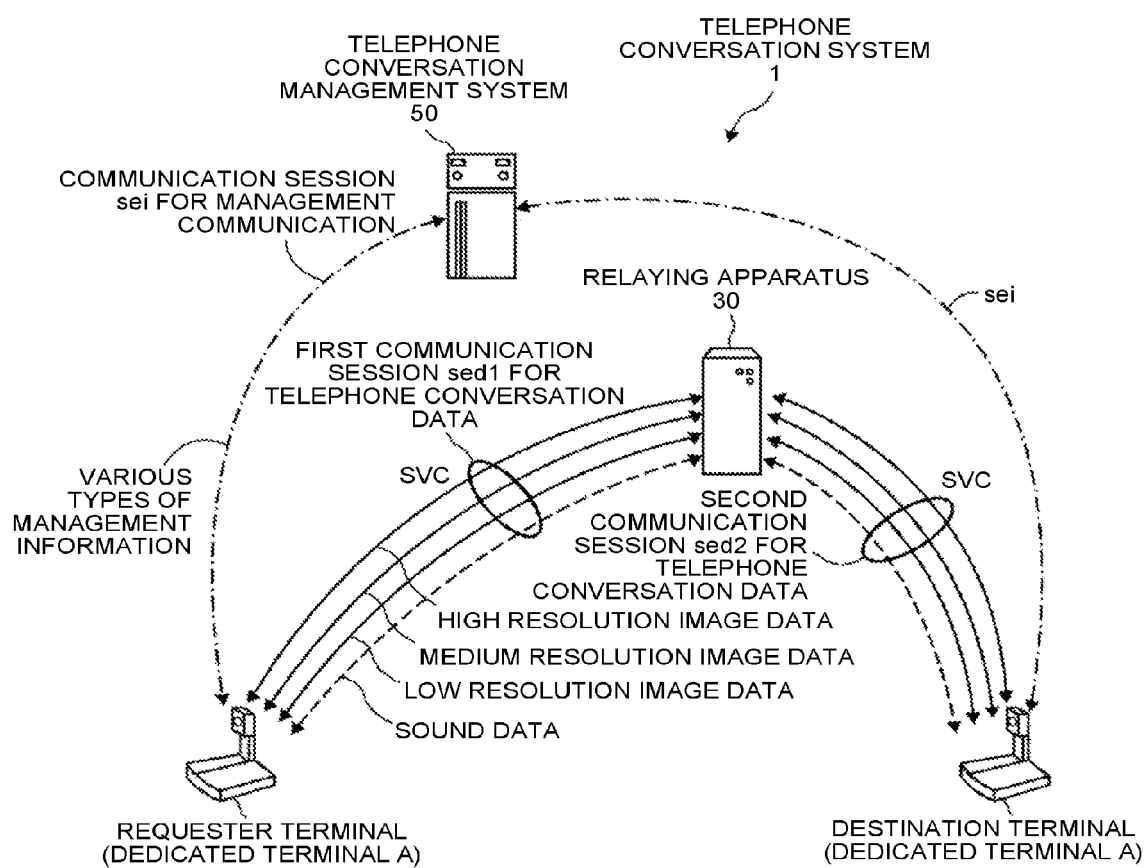
FIG. 2 is a conceptual diagram illustrating a communication state when a telephone conversation is achieved between telephone conversation terminals using the same communication scheme.

The following describes a first communication pattern to achieve a telephone conversation between two dedicated terminals A with reference to FIGS. 2 and 3A to 3C. FIG. 2 is a conceptual diagram illustrating a communication state when a telephone conversation is achieved between the telephone conversation terminals that use the same communication scheme.

In the first communication pattern as illustrated in FIG. 2, the telephone conversation system 1 performs communication of the telephone conversation data using H.264/SVC, which is a video encoding standard. Specifically, in the telephone conversation system 1 illustrated in FIG. 2, a management communication session sei for transmitting and receiving various types of management information is established between the requester terminal serving as the dedicated terminal A and the destination terminal serving as the dedicated terminal A through the management system 50. In addition, between the requester terminal and the destination terminal, four communication sessions are established for transmitting and receiving four pieces of high resolution image data, medium resolution image data, low resolution image data, and sound data through the relaying apparatus 30.

In FIG. 2, the four communication sessions established between the requester terminal and the relaying apparatus 30 are expressed as a first communication session sed1 for telephone conversation data. The four communication sessions established between the relaying apparatus 30 and the destination terminal are expressed as a second communication session sed2 for telephone conversation data.

Figure 3A:
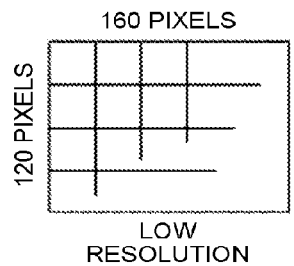
FIGS. 3A to 3C are conceptual diagrams illustrating image quality of image data transmitted and received in accordance with a scalable video coding (SVC) standard in FIGS. 2 and 4.
Figure 3B:
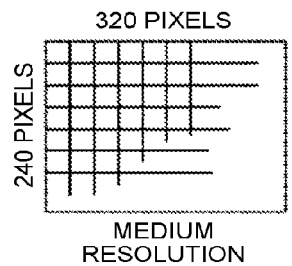
Figure 3C:
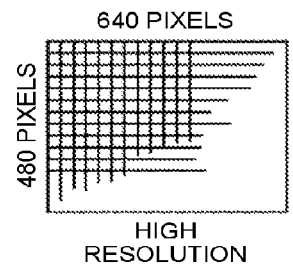

The following describes a resolution of an image of the image data handled in the first communication pattern illustrated in FIG. 2 with reference to FIGS. 3A to 3C. FIGS. 3A to 3C are conceptual diagrams illustrating image quality of the image data transmitted and received in accordance with the SVC standard illustrated in FIG. 2.

The image includes a low resolution image that is composed of 160 pixels in width by 120 pixels in length as illustrated in FIG. 3A and serves as a base image, a medium resolution image composed of 320 pixels in width by 240 pixels in length as illustrated in FIG. 3B, and a high resolution image composed of 640 pixels in width by 480 pixels in length as illustrated in FIG. 3C. Among them, when the image data is transmitted through a narrow bandwidth path, low image quality image data including only low resolution image data serving as the base image is relayed by the relaying apparatus 30. When the bandwidth is relatively wide, medium image quality image data including the low resolution image data serving as the base image and the medium resolution image data are relayed by the relaying apparatus 30. When the bandwidth is very wide, high image quality image data including the low resolution image data serving as the base image, the medium resolution image data, and high resolution image data is relayed by the relaying apparatus 30.

Figure 4:
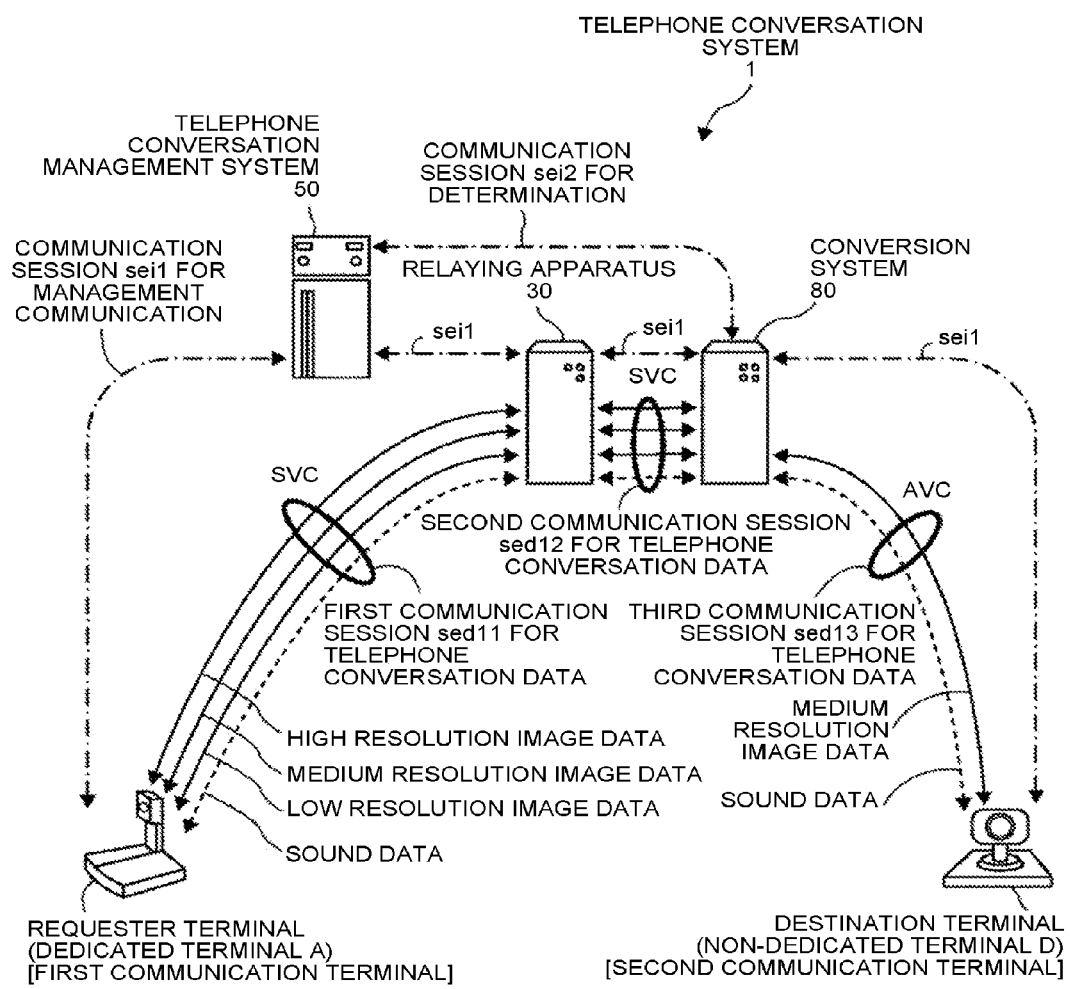
FIG. 4 is a conceptual diagram illustrating a communication state when a telephone conversation is achieved between the telephone conversation terminals using different communication schemes.
Figure 5:
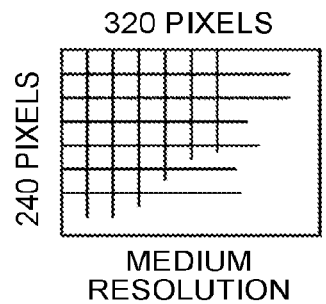
FIG. 5 is a conceptual diagram illustrating the image quality of the image data transmitted and received in accordance with an advanced video coding (AVC) standard in FIG. 4.

The following describes a second communication pattern to achieve a telephone conversation between the dedicated terminal A and the non-dedicated terminal D with reference to FIGS. 4 and 5. FIG. 4 is a conceptual diagram illustrating a communication state when a telephone conversation is achieved between the telephone conversation terminals using different communication schemes from each other.

In the second communication pattern as illustrated in FIG. 4, the telephone conversation system 1 performs communication of the telephone conversation data using H.264/SVC and H.264/AVC(advanced video coding), which are video encoding standards. Specifically, in the telephone conversation system 1 illustrated in FIG. 4, a management communication session sei1 for transmitting and receiving various types of management information is established between the requester terminal serving as the dedicated terminal A and the destination terminal serving as the non-dedicated terminal D through the management system 50. Between the management system 50 and the conversion system 80, a management communication session sei2 for transmitting and receiving various types of management information is established.

In addition, between the requester terminal (an example of a first communication terminal) and the conversion system 80, four communication sessions are established for transmitting and receiving four respective pieces of high resolution image data, medium resolution image data, low resolution image data, and sound data through the relaying apparatus 30 in accordance with H.264/SVC. In FIG. 4, the four communication sessions established between the requester terminal and the relaying apparatus 30 are expressed as a first communication session sed11 for telephone conversation data. The four communication sessions established between the relaying apparatus 30 and the conversion system 80 are expressed as a second communication session sed12 for telephone conversation data.

Furthermore, two communication sessions are established between the conversion system 80 and the destination terminal (an example of a second communication terminal) for transmitting and receiving two respective pieces of medium resolution image data and sound data in accordance with H.264/AVC. In FIG. 4, the two communication sessions established between the conversion system 80 and the destination terminal are expressed as a third communication session sed13 for telephone conversation data.

The following describes the resolution of an image of the image data handled in the second communication pattern illustrated in FIG. 4 with reference to FIGS. 3A to 3C and 5. FIG. 5 is a conceptual diagram illustrating the image quality of the image data transmitted and received in accordance with the AVC standard illustrated in FIG. 4.

In the first communication session sed11 and the second communication session sed12 illustrated in FIG. 4, three types of image data having different resolutions illustrated in FIGS. 3A to 3C are transmitted and received in the same manner as the first communication session sed1 and the second communication session sed2 illustrated in FIG. 2. In the third communication session sed13 illustrated in FIG. 4, the medium resolution image data illustrated in FIG. 5 is transmitted and received.

Hardware Structure of Embodiment

Figure 6:
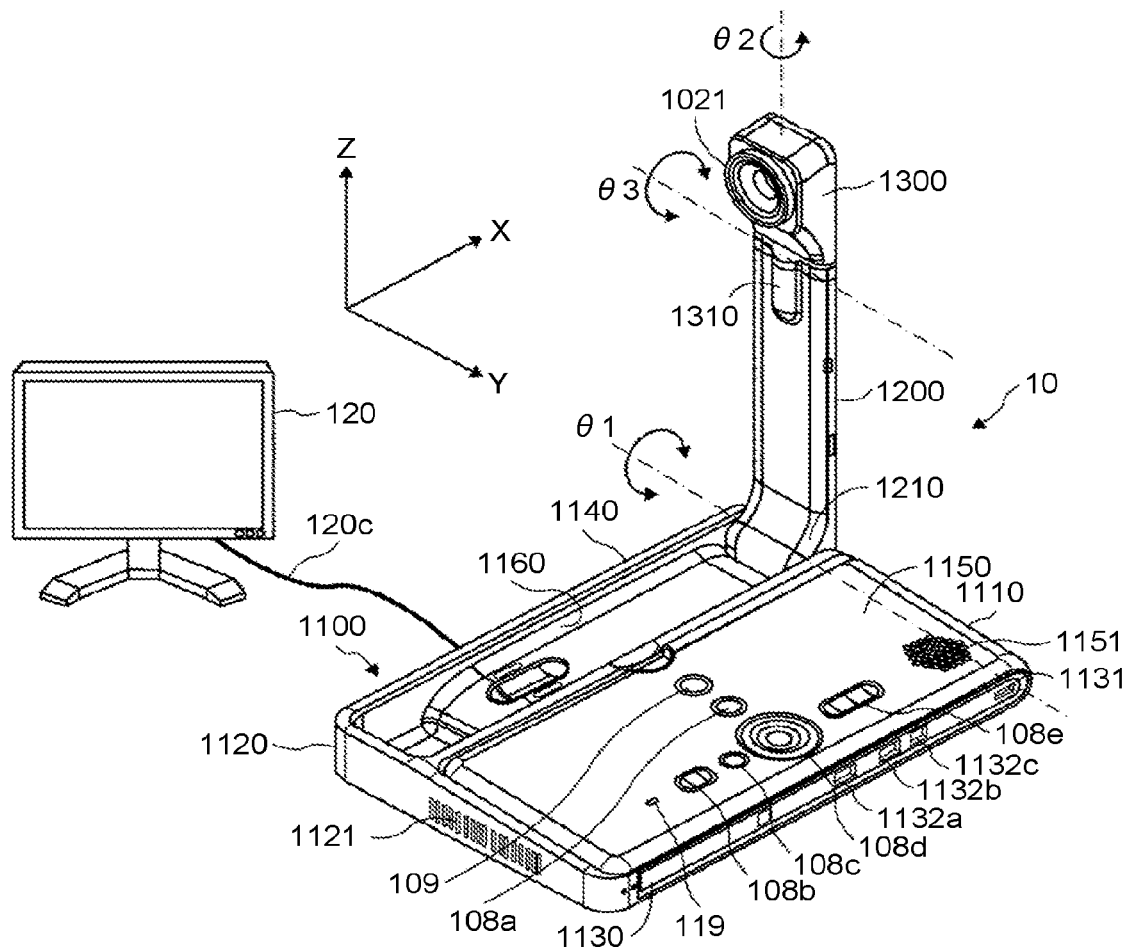
FIG. 6 is a perspective view of the telephone conversation terminal according to the embodiment.

A hardware structure of the embodiment is described below. FIG. 6 is a perspective view of the telephone conversation terminal according to the embodiment. As illustrated in FIG. 6, the terminal 10 includes a housing 1100, an arm 1200, and a camera housing 1300. A front sidewall surface 1110 of the housing 1100 includes an air intake surface (not illustrated) having a plurality of air intake holes. A rear sidewall surface 1120 of the housing 1100 includes an air exhaust surface 1121 having a plurality of air exhaust holes. As a result, external air at the front of the terminal 10 can be taken in through the air intake surface (not illustrated) and the air taken in can be exhausted toward the rear of the terminal 10 through the air exhaust surface 1121. A right sidewall surface 1130 of the housing 1100 has a sound-collecting hole 1131. The sound-collecting hole 1131 enables a built-in microphone 114, which is described later, to collect sounds such as voices, other sounds, and noises.

An operation panel 1150 is formed on a side adjacent to the right sidewall surface 1130 of the housing 1100. The operation panel 1150 is provided with a plurality of operation buttons (108a to 108e), a power source switch 109, and an alarm lamp 119, which are described later, and includes a sound output surface 1151 having a plurality of sound output holes through which a sound output from a built-in speaker 115, which is described later, passes. In addition, a housing section 1160 is formed in a recess so as to house the arm 1200 and the camera housing 1300, on a side adjacent to a left sidewall surface 1140 of the housing 1100. The right sidewall surface 1130 of the housing 1100 is provided with a plurality of connecting ports (1132a to 1132c) for electrically connecting cables to a display I/F 117, which is described later. The left sidewall surface 1140 of the housing 1100 is provided with a connecting port (not illustrated) for electrically connecting a cable 120c for the display 120 to an external device connection I/F 118, which is described later.

In the following description, an arbitrary operation button in the operation buttons (108a to 108e) is expressed as the "operation button 108" while an arbitrary connecting port in the connecting ports (1132a to 1132c) is expressed as the "connecting port 1132".

The arm 1200 is mounted on the housing 1100 with a torque hinge 1210 such that the arm 1200 is rotatable with respect to the housing 1100 in the up-down direction within a range of a tilt angle θ1 of 135 degrees. FIG. 6 illustrates the state when the tilt angle θ1 is 90 degrees. The camera housing 1300 includes a built-in camera 112, which is described later. The camera 112 can be used to image a user, a document, and a room, for example. The camera housing 1300 has a torque hinge 1310. The camera housing 1300 is mounted on the arm 1200 with the torque hinge 1310. The camera housing 1300 can rotate with respect to the arm 1200 in the up-down and left-right directions within a range of a pan angle θ2 of ±180 degrees when the angle is 0 degrees in the state illustrated in FIG. 6 and within a range of a tilt angle θ3 of ±45 degrees.

The relaying apparatus 30, the management system 50, the conversion system 80, the program supply system 90, and the maintenance system 100 have the same outer appearances as typical servers and computers. The description of their outer appearances is thus omitted.

Figure 7:
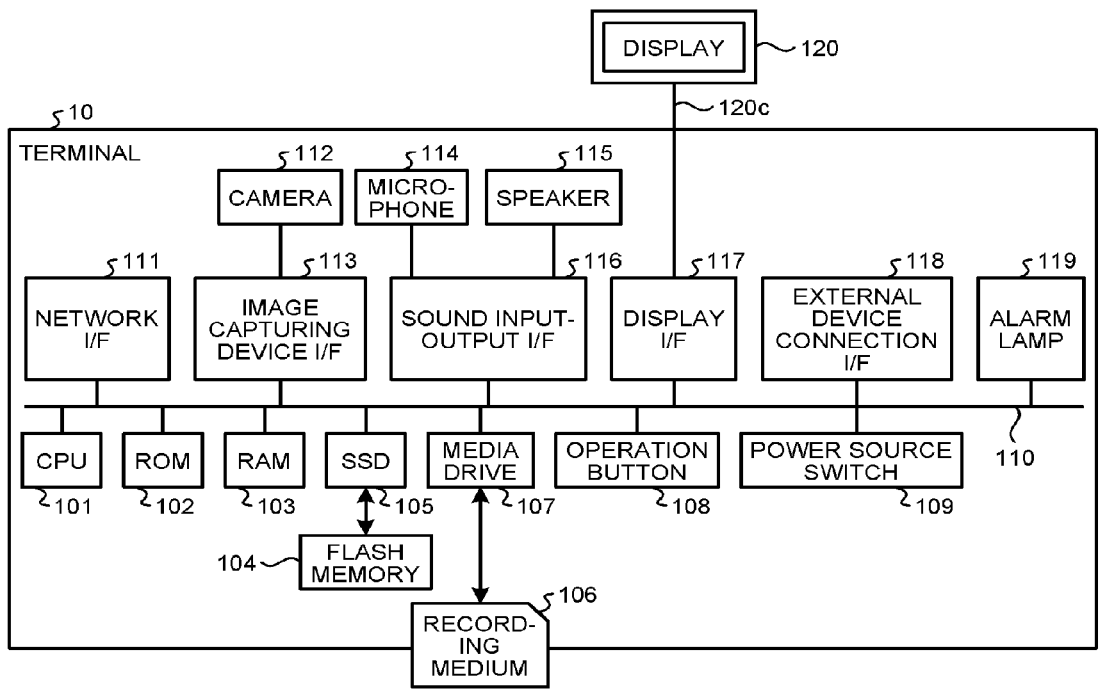
FIG. 7 is a hardware structure diagram of the telephone conversation terminal according to the embodiment.

FIG. 7 is a schematic diagram illustrating a hardware structure of the terminal according to the embodiment. As illustrated in FIG. 7, the terminal 10 of the embodiment includes a central processing unit (CPU) 101 that controls operation of the terminal 10, a read only memory (ROM) 102 that stores therein a program used to drive the CPU 101 such as an initial program loader (IPL), a random access memory (RAM) 103 that is used as a working area of the CPU 101, a flash memory 104 that stores therein various types of data such as a program for the terminal 10, the image data, and the sound data, a solid state drive (SSD) 105 that controls reading of various types of data from or writing various types of data into the flash memory 104 under the control of the CPU 101, a media drive 107 that controls reading of data from or writing (storing) of data into a recording medium 106 such as a flash memory, the operation buttons 108 operated when a destination of the terminal 10 is selected, for example, the power source switch 109 that switches on and off of the power source of the terminal 10, and a network interface (I/F) 111 that performs data transmission using the communication network 2.

The terminal 10 further includes the built-in camera 112 that images a subject and acquires the image data under the control of the CPU 101, an image capturing device I/F 113 that controls driving of the camera 112, the built-in microphone 114 that receives sounds, the built-in speaker 115 that outputs sounds, a sound input-output I/F 116 that processes input and output of a sound signal between the microphone 114 and the speaker 115 under the control of the CPU 101, a display I/F 117 that transmits the image data to the display 120 externally mounted under the control of the CPU 101, the external device connection I/F 118 that connects various external devices, the alarm lamp 119 that alarms the abnormalities of the various functions of the terminal 10, and a bus line 110 that electrically connects the above-described components as illustrated in FIG. 5, such as an address bus or a data bus.

The display 120 is a display unit that includes a liquid crystal or organic EL by which images of subjects and operation icons, for example, are displayed. The display 120 is connected to the display I/F 117 with the cable 120c. The cable 120c may be an analog RGB (VGA) signal cable, a component video cable, a high-definition multimedia interface (HDMI) signal cable, or a digital video interactive (DVI) signal cable.

The camera 112 includes a lens and a solid state image capturing device that converts light into charges so as to generate an electrically available image (picture) of a subject. As the solid state image capturing device, a complementary metal oxide semiconductor (CMOS) or a charge coupled device (CCD) is used, for example.

External devices such as an external camera, an external microphone, and an external speaker can be electrically connected to the external device connection I/F 118 with universal serial bus (USB) cables inserted into the connecting port 1132 of the housing 1100 illustrated in FIG. 6. When an external camera is connected, the external camera is driven prior to the built-in camera 112 under the control of the CPU 101. Likewise, when an external microphone and an external speaker are connected, the external microphone and the external speaker are driven prior to the built-in microphone 114 and the built-in speaker 115 under the control of the CPU 101.

The recording medium 106 is attached to the terminal 10 in a detachable manner. An electrically erasable and programmable ROM (EEPROM) may be used, for example, as a non-volatile memory from which data is read or into which data is written under the control of the CPU 101. The non-volatile memory is not limited to the flash memory 104.

Figure 8:
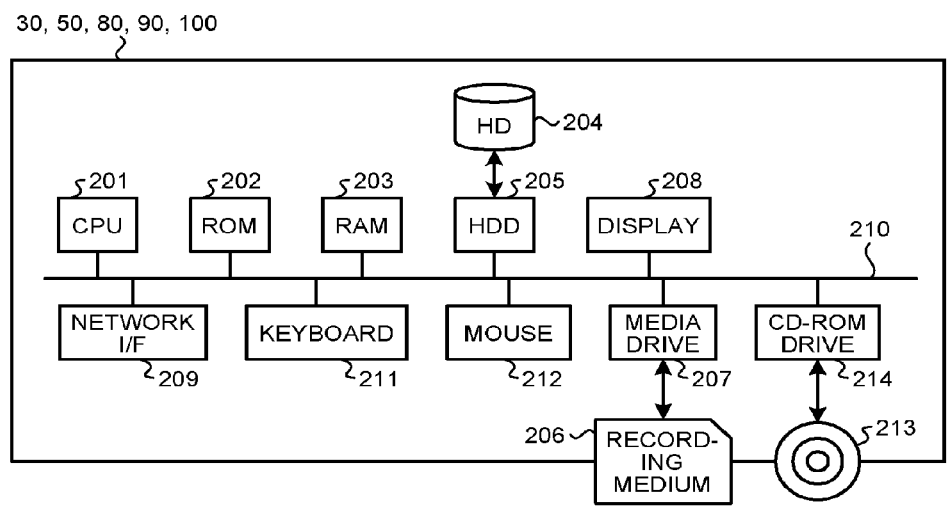
FIG. 8 is a hardware structure diagram of a telephone conversation management system, a relaying apparatus, a conversion system, a program supply system, or a maintenance system according to the embodiment.

FIG. 8 is a schematic diagram illustrating a hardware structure of the management system according to the embodiment. The management system 50 includes a CPU 201 that controls the operation of the management system 50, a ROM 202 that stores therein a program used to drive the CPU 201 such as an IPL, a RAM 203 that is used as a working area of the CPU 201, an HD 204 that stores therein various types of data such as a program for the management system 50, a hard disk drive (HDD) 205 that controls reading of various types of data from or writing of various types of data into the HD 204 under control of the CPU 201, a media drive 207 that controls reading data from or writing (storing) data into a recording medium 206 such as a flash memory, a display 208 that displays various types of information such as a cursor, menus, windows, characters, or images, a network I/F 209 that performs data communication using the communication network 2, a keyboard 211 provided with a plurality of keys to input characters, numerical values, and various instructions, a mouse 212 that is used to select and execute various instructions, select items to be processed, and move the cursor, a CD-ROM drive 214 that controls reading of various types of data from or writing of various types of data into a compact disc read only memory (CD-ROM) 213 as an example of an attachable-detachable recording medium, and a bus line 210 that electrically connects the above-described components as illustrated in FIG. 8, such as an address bus or a data bus.

The relaying apparatus 30, the conversion system 80, the program supply system 90, and the maintenance system 100 have the same hardware structure as the management system 50. The description thereof is thus omitted. The respective HDs 204 store therein various types of programs such as programs to control the respective ones of the relaying apparatus 30, the conversion system 80, the program supply system 90, and the maintenance system 100.

Each of the programs for the respective ones of the terminal 10, the relaying apparatus 30, the conversion system 80, the program supply system 90, and the maintenance system 100 may be recorded in a computer-readable recording medium (e.g., the recording medium 106) as a file in an installable or executable format, and distributed. Examples of the recording medium further include a compact disc recordable (CD-R), a digital versatile disk (DVD), and a blue-ray disk.

Functional Structure of Embodiment

Figure 9:
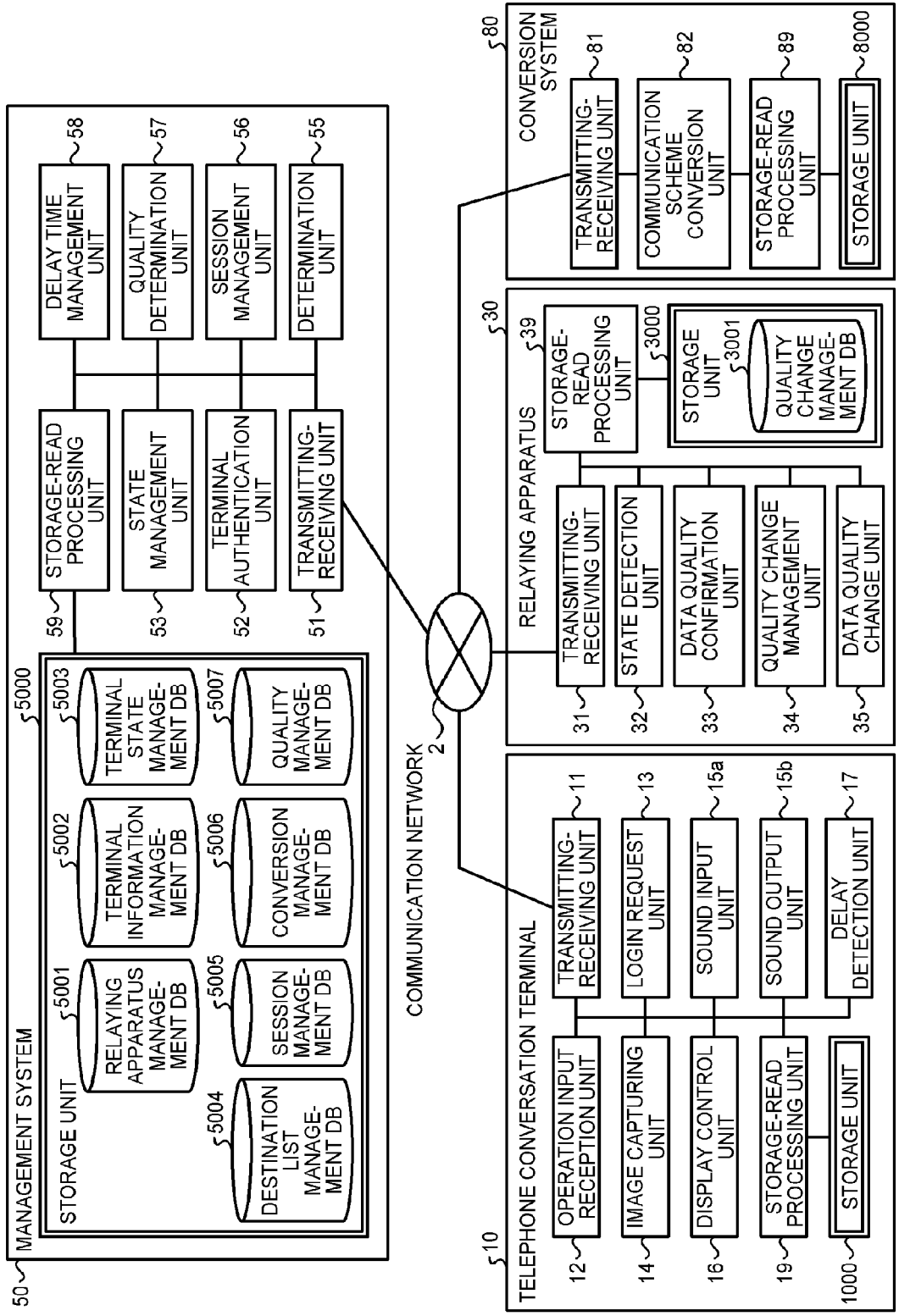
FIG. 9 is a functional block diagram of the telephone conversation terminal, the relaying apparatus, the telephone conversation management system, and the conversion system included in the telephone conversation system of the embodiment.

A functional structure of the embodiment is described below. FIG. 9 is a functional block diagram of the terminal 10, the relaying apparatus 30, the management system 50, and the conversion system 80 included in the telephone conversation system 1 of the embodiment. In FIG. 9, the terminal 10, the relaying apparatus 30, the management system 50, and the conversion system 80 are connected so as to enable data communication among them through the communication network 2.

Functional Structure of Terminal

The terminal 10 includes a transmitting-receiving unit 11, an operation input reception unit 12, a login request unit 13, an image capturing unit 14, a sound input unit 15a, a sound output unit 15b, a display control unit 16, a delay detection unit 17, and a storage-read processing unit 19. The respective units are functions or operations that are achieved when any of the components illustrated in FIG. 7 are operated by commands from the CPU 101 in accordance with the program for the terminal 10 loaded on the RAM 103 from the flash memory 104. The terminal 10 includes a storage unit 1000 structured by the RAM 103 and the flash memory 104 that are illustrated in FIG. 7.

Functional Structures of Terminal

The following describes each functional structure of the terminal 10 in detail with reference to FIGS. 7 and 9. In the following description of each functional structure of the terminal 10, a relation between each functional structure of the terminal 10 and related components that achieve each functional structure of the terminal 10 in the components illustrated in FIG. 7 is also described.

The transmitting-receiving unit 11 of the terminal 10 illustrated in FIG. 9 is implemented by a command from the CPU 101 illustrated in FIG. 7 and the network I/F 111 illustrated in FIG. 7. The transmitting-receiving unit 11 transmits and receives various types of data (or information) between itself and another terminal, apparatus, or system through the communication network 2. The transmitting-receiving unit 11 starts receiving state information indicating the state of each terminals serving as a destination candidate from the management system 50 before starting a telephone conversation with a desired destination terminal. The state information indicates not only the operation state of each terminal 10 (whether it is in an online state or an offline state) but also a detailed state such as, if it is in the online state, whether it is ready for making a telephone conversation, whether it is in a busy state, or whether a user is absent. In addition, the state information indicates not only the operation state of the terminal 10 but also various states in the terminal 10. For example, a state in which the cable 120c is detached from the terminal 10, a state in which the terminal 10 outputs sounds but no images, and a state in which the terminal 10 outputs no sounds (MUTE). The following describes a case where the state information indicates the operation state, as an example.

The operation input reception unit 12 is implemented by a command from the CPU 101 illustrated in FIG. 7, and the operation button 108 and the power source switch 109 illustrated in FIG. 7. The operation input reception unit 12 receives various types of input from a user. For example, when a user turns on the power source switch 109 illustrated in FIG. 7, the operation input reception unit 12 illustrated in FIG. 9 receives the power source on operation and causes the power source to be turned on.

The login request unit 13 is implemented by a command from the CPU 101 illustrated in FIG. 7. When receiving a power source on operation, the login request unit 13 automatically transmits login request information indicating a request for a login and a current IP address of the requester terminal to the management system 50 from the transmitting-receiving unit 11 through the communication network 2. When the user switches the power source switch 109 from the on state to the off state, the operation input reception unit 12 completely turns off the power source after the transmitting-receiving unit 11 transmits the state information indicating that the power source is to be turned off to the management system 50. As a result, the management system 50 can grasp the fact that the power source of the terminal 10 has been turned off from the on state.

The image capturing unit 14 is implemented by a command from the CPU 101 illustrated in FIG. 7 and the camera 112 and the image capturing device I/F 113 illustrated in FIG. 7. The image capturing unit 14 images a subject and outputs the resulting image data.

The sound input unit 15a is implemented by a command from the CPU 101 illustrated in FIG. 7 and the sound input-output I/F 116 illustrated in FIG. 7. After a sound of a user is converted into sound data by the microphone 114, the sound input unit 15a receives sound data relating to the sound signal. The sound output unit 15b is implemented by a command from the CPU 101 illustrated in FIG. 7 and the sound input-output I/F 116 illustrated in FIG. 7. The sound output unit 15b outputs a sound signal relating to sound data to a speaker so as to cause the speaker 115 to output a sound.

The display control unit 16 is implemented by a command from the CPU 101 illustrated in FIG. 7 and the display I/F 117 illustrated in FIG. 7. As described later, the display control unit 16 performs control so as to combine the pieces of received image data having different resolutions and transmit the combined image data to the display 120. The display control unit 16 can transmit information about a destination list, which is received from the management system 50, to the display 120 so as to cause the display 120 to display the destination list.

The delay detection unit 17 is implemented by a command from the CPU 101 illustrated in FIG. 7. The delay detection unit 17 detects a delay time (ms) of image data or sound data transmitted from another terminal 10 through the relaying apparatus 30.

The storage-read processing unit 19 is executed by a command from the CPU 101 illustrated in FIG. 7 and the SSD 105 illustrated in FIG. 7 or implemented by a command from the CPU 101. The storage-read processing unit 19 stores various types of data in the storage unit 1000 and reads various types of data from the storage unit 1000. The storage unit 1000 stores therein a terminal identification (ID) and a password for identifying the terminal 10, for example. In the storage unit 1000, image data and sound data that are received when a telephone conversation is made with the destination terminal are stored and overwritten with new image data and sound data at every receiving of the data. In this regard, an image is displayed on the display 120 in accordance with the image data before being overwritten while a sound is output from the speaker 115 in accordance with the sound data before being overwritten.

The terminal ID and a relaying apparatus ID, which is described later, of the embodiment indicate identifying information used for uniquely identifying the terminal 10 and the relaying apparatus 30. For example, the identifying information is languages, characters, symbols, or various signs. The terminal ID and the relaying apparatus ID may be the identifying information obtained by combining at least two of the languages, characters, symbols, and various signs.

Functional Structure of Relaying Apparatus

The relaying apparatus 30 includes a transmitting-receiving unit 31, a state detection unit 32, a data quality confirmation unit 33, a quality change management unit 34, a data quality change unit 35, and a storage-read processing unit 39. The respective units are functions or operations that are implemented when any of the components illustrated in FIG. 8 are operated by commands from the CPU 201 in accordance with the program for the relaying apparatus 30 loaded on the RAM 203 from the HD 204. The relaying apparatus 30 includes a storage unit 3000 structured by the RAM 203 illustrated in FIG. 8 and/or the HD 204 illustrated in FIG. 8.

Quality Change Management Table

FIG. 10 is a conceptual diagram illustrating a quality change management table. In the storage unit 3000, a quality change management database (DB) 3001 having the quality change management table illustrated in FIG. 10 is structured. In the quality change management table, the IP address of the terminal 10 serving as the relay destination (destination) of image data and image quality of the image data to be relayed by the relaying apparatus 30 to the relay destination are managed in association with each other.

Functional Structures of Relaying Apparatus

The following describes each functional structure of the relaying apparatus 30 in detail. In the following description of each functional structure of the relaying apparatus 30, a relation between each functional structure of the relaying apparatus 30 and related components that achieve each functional structure of the relaying apparatus 30 among the components illustrated in FIG. 8 is also described.

The transmitting-receiving unit 31 of the relaying apparatus 30 illustrated in FIG. 9 is implemented by a command from the CPU 201 illustrated in FIG. 8 and the network I/F 209 illustrated in FIG. 8. The transmitting-receiving unit 31 transmits and receives various types of data (or information) between itself and another terminal, apparatus, or system through the communication network 2. The transmitting-receiving unit 31 initializes the communication session in the relaying apparatus 30.

The transmitting-receiving unit 31 transmits session start instruction information that instructs a start of the communication session (the first communication session) to an address indicated with the IP address of the requester terminal out of the IP addresses received by the transmitting-receiving unit 31. The transmitting-receiving unit 31 transmits the session start instruction information that instructs a start of the communication session (the second communication session) and the IP address of the destination terminal to an address indicated with the IP address of the conversion system 80 out of the IP addresses received by the transmitting-receiving unit 31.

The state detection unit 32 is implemented by a command from the CPU 201 illustrated in FIG. 8. The state detection unit 32 detects the operation state of the relaying apparatus 30 including the state detection unit 32. The operation state is the "online" state, the "offline" state, the "busy" state, or a "temporary halt" state.

The data quality confirmation unit 33 is implemented by a command from the CPU 201 illustrated in FIG. 8. The data quality confirmation unit 33 searches the quality change management table (refer to FIG. 10) using the IP address of the destination terminal as a searching key, and extracts the image quality of the image data to be relayed corresponding to the IP address, thereby confirming the image quality of the image data to be relayed.

The quality change management unit 34 is implemented by a command from the CPU 201 illustrated in FIG. 8. The quality change management unit 34 changes the content of the quality change management table (refer to FIG. 10) in accordance with quality information, which is described later, transmitted from the management system 50. For example, in a teleconference held between the requester terminal (terminal 10aa) having the terminal ID "01aa" and the destination terminal (terminal 10ba) having the terminal ID "10ba" by transmitting and receiving high image quality image data, when a delay occurs in receiving the image data at the destination terminal (terminal 10ba) due to a start of another teleconference held between the requester terminal (terminal 10bb) and the destination terminal (terminal 10ca) through the communication network 2, the relaying apparatus 30 lowers the image quality of the image data, which has been relayed by the relaying apparatus 30, from high image quality to medium image quality. In such a case, the content of the quality change management table (refer to FIG. 10) is changed so as to lower the image quality of the image data relayed by the relaying apparatus 30 from high image quality to medium image quality, in accordance with the quality information indicating the medium image quality.

The data quality change unit 35 is implemented by a command from the CPU 201 illustrated in FIG. 8. The data quality change unit 35 changes the image quality of the image data transmitted from the sender terminal in accordance with the changed content of the quality change management table (refer to FIG. 10).

The storage-read processing unit 39 is implemented by a command from the CPU 201 illustrated in FIG. 8 and the HDD 205 illustrated in FIG. 8. The storage-read processing unit 39 stores various types of data in the storage unit 3000 and reads various types of data stored in the storage unit 3000.

Functional Structure of Management System

The management system 50 includes a transmitting-receiving unit 51, a terminal authentication unit 52, a state management unit 53, a determination unit 55, a session management unit 56, a quality determination unit 57, a delay time management unit 58, and a storage-read processing unit 59. The respective units are functions or operations that are implemented when any of the components illustrated in FIG. 8 are operated by commands from the CPU 201 in accordance with the program for the management system 50 loaded on the RAM 203 from the HD 204. The management system 50 includes a storage unit 5000 structured by the HD 204 illustrated in FIG. 8.

Relaying Apparatus Management Table

FIG. 11 is a conceptual diagram illustrating a relaying apparatus management table. In the storage unit 5000, a relaying apparatus management DB 5001 having the relaying apparatus management table illustrated in FIG. 11 is structured. In the relaying apparatus management table, the operation state of the relaying apparatus 30, a receiving date at which the management system 50 receives the state information indicating the operation state, the IP address of the relaying apparatus 30, and a maximum data speed in telephone conversation (Mbps) of the relaying apparatus 30 are managed in association with each other for each relaying apparatus ID of the relaying apparatuses 30. For example, the relaying apparatus management table illustrated in FIG. 11 indicates that, in relation to the relaying apparatus 30a having the relaying apparatus ID "111a", the operation state is "online", the date at which the management system 50 receives the state information is "13:00 on Nov. 10, 2011", the IP address is "1.2.1.2", and the maximum data speed in telephone conversation is 100 Mbps.

Terminal Information Management Table

FIG. 12 is a conceptual diagram illustrating a terminal information management table. In the storage unit 5000, a terminal information management DB 5002 having the terminal information management table illustrated in FIG. 12 is structured. In the terminal information management table, a password for identification, a model number of the terminal 10, a serial number of the terminal 10, a communication scheme of the terminal 10, and the IP address of the non-dedicated terminal D in association with each other for each terminal ID of all of the terminals 10 managed by the management system 50. For example, the terminal information management table illustrated in FIG. 12 indicates that, in relation to the terminal 10da, the terminal ID is "01da", the password is "dada", the model number is "8001", the serial number is "1001", the communication scheme is "non-dedicated 1", and the IP address is "1.3.2.3". The IP addresses of the non-dedicated terminals D are managed as static data in the terminal information management table (refer to FIG. 12) whereas the IP addresses of the dedicated terminals A are managed as dynamic data in a terminal state management table described below (refer to FIG. 13). Thus, the dedicated terminal A is more convenient than the non-dedicated terminal D in terms of that the dedicated terminal A copes with a change in IP address.

In the terminal information management table, "dedicated" in the communication scheme represents the communication scheme that the dedicated terminal A, which is illustrated in FIGS. 2 and 4, uses. The communication scheme of "non-dedicated 1" represents the communication scheme that the non-dedicated terminal D illustrated in FIG. 4 uses. The communication scheme of "non-dedicated 2" represents a communication scheme that is different from the communication schemes that the dedicated terminal A and the non-dedicated terminal D use.

Terminal State Management Table

FIG. 13 is a conceptual diagram illustrating a terminal state management table. In the storage unit 5000, a terminal state management DB 5003 having the terminal state management table illustrated in FIG. 13 is structured. In the terminal state management table, for each terminal ID of the terminals 10, the terminal name of the terminal 10 when designated as the destination, the operation state of the terminal 10, a receiving date at which the management system 50 receives the login request information, which is described later, and the IP address of the terminal 10 are managed in association with each other. For example, the terminal state management table illustrated in FIG. 13 indicates that, in relation to the terminal 10aa having the terminal ID "01aa", the terminal name is "terminal AA, Tokyo business office, Japan", the operation state is "online (ready for making a telephone conversation)", the date at which management system 50 receives the login request information is "13:40 on Nov. 10, 2011", and the IP address is "1.2.1.3".

The terminal state management table does not manage the IP addresses of the terminals 10 other than the dedicated terminals A, i.e., the non-dedicated terminals D, because the non-dedicated terminals D are not included therein as management targets.

Destination List Management Table

FIG. 14 is a conceptual diagram illustrating a destination list management table. In the storage unit 5000, a destination list management DB 5004 having the destination list management table illustrated in FIG. 14 is structured. In the destination list management table, the terminal ID of the requester terminal that requests a start of a telephone conversation is associated with all of terminal IDs of the destination terminals registered as the destination candidates of the requester terminal. For example, the destination list management table illustrated in FIG. 14 indicates that the destination candidates of the requester terminal (terminal 10aa) having the terminal ID "01aa" are the terminal 10ab having the terminal ID "01ab", the terminal 10ba having the terminal ID "01ba", and the terminal 10bb having the terminal ID "01bb". The requester terminal (terminal 10aa) can request a start of a telephone conversation to those destination candidates. Update of the destination candidates is performed by adding or deleting a terminal in accordance with an adding request or a deleting request made from an arbitrary requester terminal to the management system 50. In contrast to the destination list management table (refer to FIG. 14) that does not manage the terminal IDs of the terminals 10 other than the dedicated terminals A, the terminal state management table (refer to FIG. 13) manages terminal IDs of the terminals 10 other than the dedicated terminals A.

Session Management Table

FIG. 15 is a conceptual diagram illustrating a session management table. In the storage unit 5000, a session management DB 5005 having the session management table illustrated in FIG. 15 is structured. In the session management table, a session ID, the relaying apparatus ID of the relaying apparatus 30 used for relaying image data and sound data, the terminal ID of the requester terminal, the terminal ID of the destination terminal, delay time (ms) in receiving the image data at the destination terminal, and the receiving date at which the management system 50 receives delay time information indicating the delay time from the destination terminal are managed in association with each other. For example, the session management table illustrated in FIG. 15 indicates that the relaying apparatus 30a (the relaying apparatus ID is "111a") relays image data and sound data between the requester terminal (terminal 10aa) having the terminal ID "01aa" and the destination terminal (terminal 10ca) having the terminal ID "01ca", and the delay time of the image data is 200 (ms) at the destination terminal (terminal 10ca) as at "14:00 on Nov. 10, 2011". When a telephone conversation is made between two terminals 10, the receiving date of the delay time information may be managed in accordance with the delay time information transmitted from the requester terminal, instead of the destination terminal. However, when a telephone conversation is made among three or more terminals 10, the receiving date of the delay time information is managed in accordance with the delay time information transmitted from the terminal 10 that receives image data and sound data.

Conversion Management Table

FIG. 16 is a conceptual diagram illustrating a conversion management table. In the storage unit 5000, a conversion management DB 5006 having the conversion management table illustrated in FIG. 16 is structured. In the conversion management table, the terminal ID of the non-dedicated terminal (including the terminals using the non-dedicated 1 and the non-dedicated 2 as the communication schemes), the IP address of the conversion system 80, and the IP address of the non-dedicated terminal are managed in association with each other.

Quality Management Table

FIG. 17 is a conceptual diagram illustrating a quality management table. In the storage unit 5000, a quality management DB 5007 having the quality management table illustrated in FIG. 17 is structured. In the quality management table, the delay time information indicating the delay time of image data and image quality information indicating image quality (quality of an image) of image data are managed in association with each other in such a manner that as the delay time (ms) of image data at the requester terminal or the destination terminal increases, the image quality of image data relayed by the relaying apparatus 30 is lowered.

Functional Structures of Management System

The following describes each functional structure of the management system 50 in detail. In the following description of each functional structure of the management system 50, a relation between each functional structure of the management system 50 and related components that achieve each functional structure of the management system 50 among the components illustrated in FIG. 8 is also described.

The transmitting-receiving unit 51 is executed by a command from the CPU 201 illustrated in FIG. 8 and the network I/F 209 illustrated in FIG. 8. The transmitting-receiving unit 51 transmits and receives various types of data (or information) between itself and the other terminals, apparatuses, or the system through the communication network 2.

The terminal authentication unit 52 is implemented by a command from the CPU 201 illustrated in FIG. 8. The terminal authentication unit 52 searches the terminal information management table (refer to FIG. 12) using the terminal ID and the password that are included in the login request information received through the transmitting-receiving unit 51 as searching keys, and performs terminal authentication by determining whether the same terminal ID and password are managed in the terminal information management table.

The state management unit 53 is implemented by a command from the CPU 201 illustrated in FIG. 8. The state management unit 53 stores the terminal ID of the requester terminal, the operation state of the requester terminal, the receiving date at which the management system 50 receives the login request information, and the IP address of the requester terminal in the terminal state management table (refer to FIG. 13) and manages them in association with each other so as to manage the operation state of the requester terminal that makes a login request. The state management unit 53 changes the operation state in the terminal state management table (refer to FIG. 13) from online to offline in accordance with the state information that is sent from the terminal 10 and indicates that the power source is to be turned off when a user turns off the power source switch 109 of the terminal 10 from the on state.

The determination unit 55 is implemented by a command from the CPU 201 illustrated in FIG. 8. The determination unit 55 determines whether the communication scheme used by the terminal 10 is the communication scheme used by the dedicated terminal A.

The session management unit 56 is implemented by a command from the CPU 201 illustrated in FIG. 8. The session management unit 56 stores, in the session management table of the storage unit 5000 (refer to FIG. 15), the relaying apparatus ID of the relaying apparatus 30 used for relaying telephone conversation data, the terminal ID of the requester terminal, the terminal ID of the destination terminal, the delay time (ms) in receiving image data at the destination terminal, and the receiving date at which the management system 50 receives the delay time information indicating the delay time from the destination terminal in association with each other, and manages them. The session management unit 56 produces the session ID used for establishing the communication session.

The quality determination unit 57 determines the image quality of image data relayed by the relaying apparatus 30 on the basis of the image quality information about the image data extracted by the storage-read processing unit 59, which is described later.

The delay time management unit 58 is implemented by a command from the CPU 201 illustrated in FIG. 8. The delay time management unit 58 stores, in the session management table of the session management DB 5005 (refer to FIG. 15), the delay time indicated by the delay time information in a field of the delay time of a record including the terminal ID extracted by the storage-read processing unit 59, which is described later.

The storage-read processing unit 59 is executed by a command from the CPU 201 illustrated in FIG. 8 and the HDD 205 illustrated in FIG. 8. The storage-read processing unit 59 stores various types of data in the storage unit 5000 and reads various types of data stored in the storage unit 5000. For example, the storage-read processing unit 59 searches the respective management DBs structured in the storage unit 5000 and reads data (information) corresponding to a searching key as a searching result.

Functional Structure of Conversion System

The conversion system 80 includes a transmitting-receiving unit 81, a communication scheme conversion unit 82, and a storage-read processing unit 89. The respective units are functions or operations that are implemented when any of the components illustrated in FIG. 8 are operated by commands from the CPU 201 in accordance with the program for the conversion system 80 loaded on the RAM 203 from the HD 204. The conversion system 80 includes a storage unit 8000 structured by the RAM 203 illustrated in FIG. 8 and/or the HD 204 illustrated in FIG. 8. The storage unit 8000 stores therein conversion rule data used for the conversion of communication data.

Functional Structures of Conversion System

The following describes each functional structure of the conversion system 80 in detail with reference to FIGS. 8 and 9. In the following description of each functional structure of the conversion system 80, a relation between each functional structure of the conversion system 80 and related components that achieve each functional structure of the conversion system 80 among the components illustrated in FIG. 8 is also described.

The transmitting-receiving unit 81 of the conversion system 80 illustrated in FIG. 9 is implemented by a command from the CPU 201 illustrated in FIG. 8 and the network I/F 209 illustrated in FIG. 8. The transmitting-receiving unit 81 transmits and receives various types of data (or information) between itself and another terminal, apparatus, or system through the communication network 2. The transmitting-receiving unit 81 transmits session start instruction information to instruct a start of the communication session (the third communication session) to the destination indicated by position information transmitted by the relaying apparatus 30. Examples of the position information include the IP address and a uniform resource identifier (URI).

The communication scheme conversion unit 82 mutually converts the communication scheme of the telephone conversation data transmitted from the requester terminal and the communication scheme of the telephone conversation data transmitted from the destination terminal in accordance with the conversion rule data of the communication scheme stored in the storage unit 8000.

The storage-read processing unit 89 is executed by a command from the CPU 201 illustrated in FIG. 8 and the HDD 205 illustrated in FIG. 8. The storage-read processing unit 89 stores various types of data in the storage unit 8000 or reads various types of data stored in the storage unit 8000.

Processing or Operation of Embodiment

Figure 18:
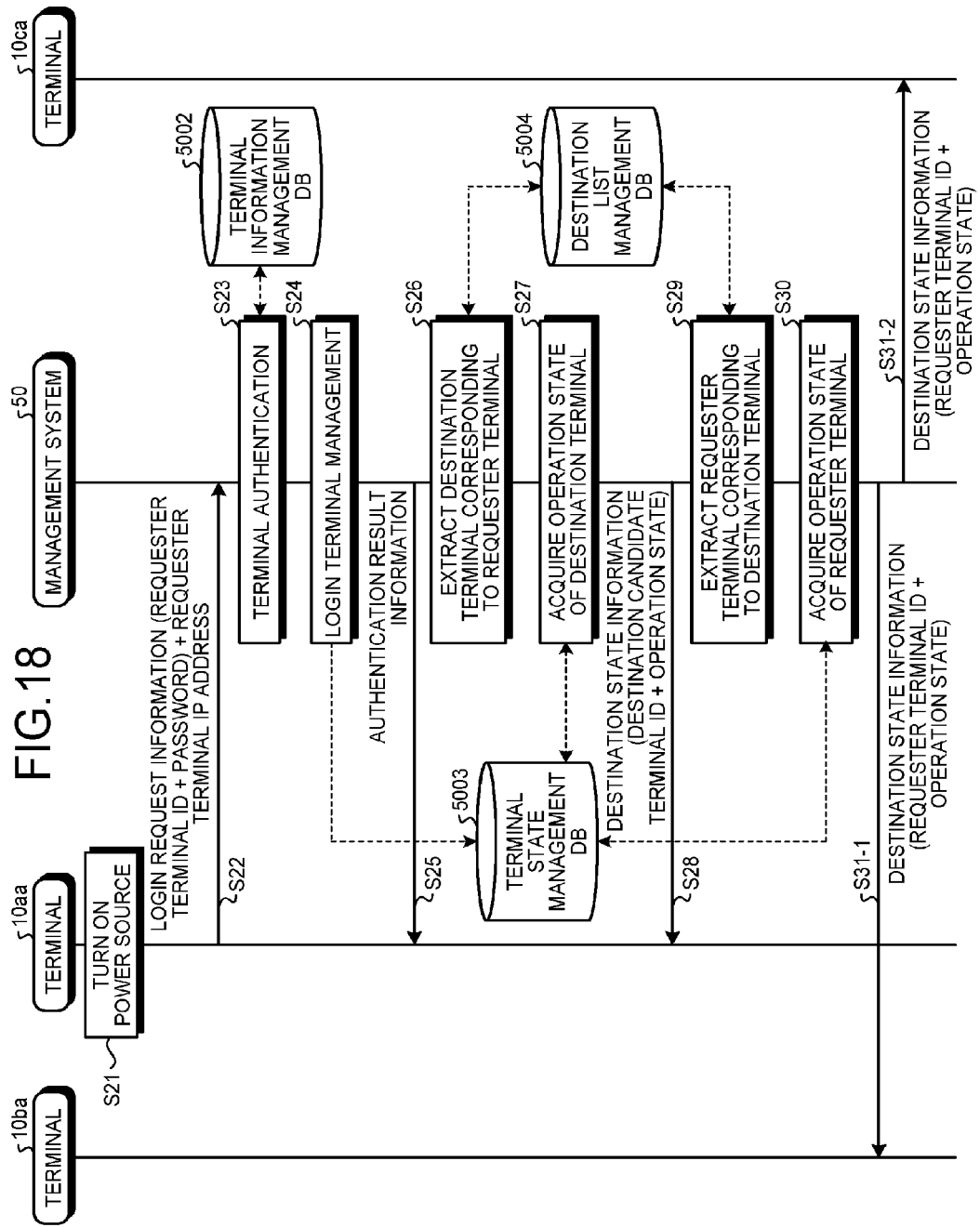
FIG. 18 is a sequence diagram illustrating processing at a preparatory stage in which a preparation is made for starting a telephone conversation between the terminals.

The following describes the first communication pattern in which a telephone conversation is made between two dedicated terminals A with reference to FIGS. 18 to 25C. Specifically, a case is described where a telephone conversation is made between the terminal 10aa serving as the dedicated terminal A and the terminal 10ca serving as the dedicated terminal A. FIG. 18 is a sequence diagram illustrating processing at a preparatory stage in which a preparation is made for starting a telephone conversation between the terminals. In FIG. 18, various types of management information are all transmitted and received by the management communication session sei illustrated in FIG. 2.

When a user turns on the power source switch 109 illustrated in FIGS. 6 and 7, the operation input reception unit 12 illustrated in FIG. 9 receives the power source on operation and causes the power source to be turned on as illustrated in FIG. 18 (step S21). When the power source on operation is received, the login request unit 13 automatically transmits the login request information indicating a request for a login to the management system 50 from the transmitting-receiving unit 11 through the communication network 2 (step S22). The login request information includes the terminal ID and the password with which the terminal can identify itself serving as the requester terminal (the transmission terminal 10aa). The terminal ID and the password are read from the storage unit 1000 through the storage-read processing unit 19 and transmitted to the transmitting-receiving unit 11 as data. When the login request information is transmitted to the management system 50 from the requester terminal (terminal 10aa), the management system 50 serving as the receiving side can grasp the IP address of the requester terminal (terminal 10aa) serving as the transmission side.

The terminal authentication unit 52 of the management system 50 searches the terminal information management table (refer to FIG. 12) using the terminal ID and the password that are included in the login request information received through the transmitting-receiving unit 51 as searching keys, and performs terminal authentication by determining whether the same terminal ID and password are managed in the terminal information management DB 5002 (step S23). If the terminal authentication unit 52, which manages the same terminal ID and password, determines that the login request is transmitted from the authentic terminal 10 having a use authority, the state management unit 53 stores, in the terminal state management table (refer to FIG. 13), the terminal ID and the operation state of the requester terminal (terminal 10aa), the receiving date of the login request information, and the IP address of the terminal 10aa in association with each other (step S24). As a result, the terminal state management table (refer to FIG. 13) manages the operation state "online", the receiving date "13:40 on Nov. 10, 2011", and the IP address "1.2.1.3" of the requester terminal (terminal 10aa) in association with the terminal ID "01aa".

The transmitting-receiving unit 51 of the management system 50 transmits authentication result information indicating the authentication result obtained by the terminal authentication unit 52 to the requester terminal (terminal 10aa) that has made the login request through the communication network 2 (step S25). In the embodiment, the following description is made on the case where the requester terminal is determined as the authentic terminal 10 having a use authority by the terminal authentication unit 52.

The storage-read processing unit 59 of the management system 50 searches the destination list management table (refer to FIG. 14) using the terminal ID "01aa" of the requester terminal (terminal 10aa) that has made the login request as a searching key, and extracts the terminal IDs of the candidates of the destination terminal capable of performing communication with the requester terminal (terminal 10aa) (step S26). In this case, the terminal IDs ("01ab", "01ba", etc.) of the destination terminals (terminals 10ab, 10ba, etc.) corresponding to the terminal ID "01aa" of the requester terminal (terminal 10aa) are extracted.

The storage-read processing unit 59 searches the terminal state management table (refer to FIG. 13) using the terminal IDs ("01ab", "01ba", etc.) of the candidates of the destination terminal extracted at step S26 as searching keys, reads the operation states ("offline", "online", etc.) corresponding to the respective terminal IDs, and acquires the respective operation states of the terminals (10ab, 10ba, etc.) (step S27).

The transmitting-receiving unit 51 transmits, to the requester terminal (terminal 10aa) through the communication network 2, destination state information including the terminal IDs ("01ab", "01ba", etc.) used as the searching keys at step S27 and the respective operation states ("offline", "online", etc.) of the destination terminals (terminals 10ab, 10ba, etc.) corresponding to the respective terminal IDs (step S28). As a result, the requester terminal (terminal 10aa) can grasp the respective current operation states ("offline", "online", etc.) of the terminals (10ab, 10ba, etc.) that are the candidates of the destination terminal capable of performing communication with the requester terminal (terminal 10aa).

The storage-read processing unit 59 searches the destination list management table (refer to FIG. 14) using the terminal ID "01aa" of the requester terminal (terminal 10aa) that has made the login request as a searching key, and extracts the terminal IDs of other requester terminals that register the terminal ID "01aa" of the requester terminal (terminal 10aa) as the candidate of the destination terminal (step S29). In the destination list management table illustrated in FIG. 14, the terminal IDs "01ba", "01ca", and "01da" are extracted as those of the other requester terminals, for example. In the following description, the terminal IDs "01ba", "01ca", and "01da" are extracted as those of the other requester terminals, for simple explanation.

The storage-read processing unit 59 searches the terminal state management table (refer to FIG. 13) using the terminal ID "01aa" of the requester terminal (terminal 10aa) that has made the login request as a searching key, and acquires the operation state of the requester terminal (terminal 10aa) that has made the login request (step S30). The transmitting-receiving unit 51 transmits the destination state information including the terminal ID "01aa" of the requester terminal (terminal 10aa) and the operation state "online" that are acquired at step S30 to the terminals (10ba and 10ca) each operation state of which is "online" in the terminal state management table (refer to FIG. 13) in the terminals (10ba, 10ca, and 10da) that are identified with the terminal IDs ("01ba", "01ca", and "01da") extracted at step S29 (steps S31-1 and S31-2). When transmitting the destination state information to the terminals (10ba and 10ca), the transmitting-receiving unit 51 refers to the IP addresses of the terminals managed by the terminal state management table (refer to FIG. 13) in accordance with the respective terminal IDs ("01ba" and "01ca"). As a result, the terminal ID "01aa" and the operation state "online" of the requester terminal (terminal 10aa) that has made the login request can be transmitted to each of the other destination terminals (terminals 10ba and 10ca) capable of performing communication with the requester terminal (terminal 10aa) that has made the login request as the destination.

The transmitting-receiving unit 51, however, cannot transmit, to the terminal 10da serving as the non-dedicated terminal D, the terminal ID "01aa" and the operation state "online" of the requester terminal (terminal 10aa) that has made the login request because the operation state of the non-dedicated terminal D is not managed by the terminal state management table (refer to FIG. 13). The non-dedicated terminal D cannot enjoy services and cannot receive the operation state of the dedicated terminal A.

In each of the other terminals 10, when a user turns on the power source switch 109 illustrated in FIGS. 6 and 7, the operation input reception unit 12 illustrated in FIG. 9 receives the power source on operation in the same manner as step S21, and then the processing is performed in the same manner as steps S22 to S31-1 and S31-2. The description thereof is thus omitted.

Figure 19:
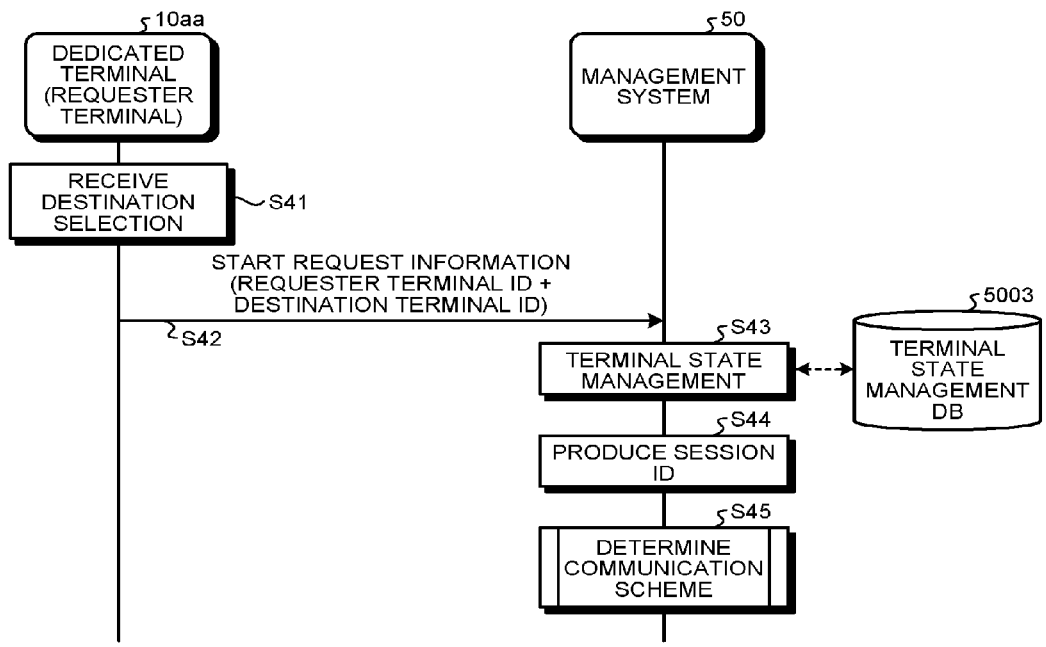
FIG. 19 is a sequence diagram illustrating a request for stating a telephone conversation.

The following describes the case where a telephone conversation is made between two dedicated terminals A with reference to FIGS. 6, 9, and 19 to 22. FIG. 19 is a sequence diagram illustrating a request for stating a telephone conversation.

As illustrated in FIG. 19, when a user of the requester terminal (terminal 10aa) serving as the dedicated terminal A presses down the operation button 108 illustrated in FIG. 6 to select the destination terminal (terminal 10ca) that is a destination candidate and serves as the dedicated terminal A, the operation input reception unit 12 illustrated in FIG. 9 receives the request for starting a telephone conversation with the destination terminal (terminal 10ca) (step S41). The transmitting-receiving unit 11 of the requester terminal (terminal 10aa) transmits, to the management system 50, start request information indicating the start of the telephone conversation (step S42). The start request information includes the terminal ID "01aa" of the requester terminal (terminal 10aa) and the terminal ID "01ca" of the destination terminal (terminal 10ca).

The state management unit 53 of the management system 50 illustrated in FIG. 9 changes both fields of the operation state in the records including the respective terminal IDs "01aa" and "01ca" of the terminal state management table (refer to FIG. 13) to "online (busy)" in accordance with the terminal ID "01aa" of the requester terminal (terminal 10aa) and the terminal ID "01ca" of the destination terminal (terminal 10ca) that are included in the start request information (step S43). The requester terminal (terminal 10aa) and the destination terminal (terminal 10ca) do not start a telephone conversation, actually; however, their states are changed to "busy". If another terminal 10 tries to have a telephone conversation with the requester terminal (terminal 10aa) or the destination terminal (terminal 10ca), a notification sound or display that indicates what is called a busy line is output.

The session management unit 56 of the management system 50 produces the session ID used for establishing the communication session (step S44). The management system 50 determines which communication scheme is used by the destination terminal (terminal 10ca) (step S45).

Figure 20:
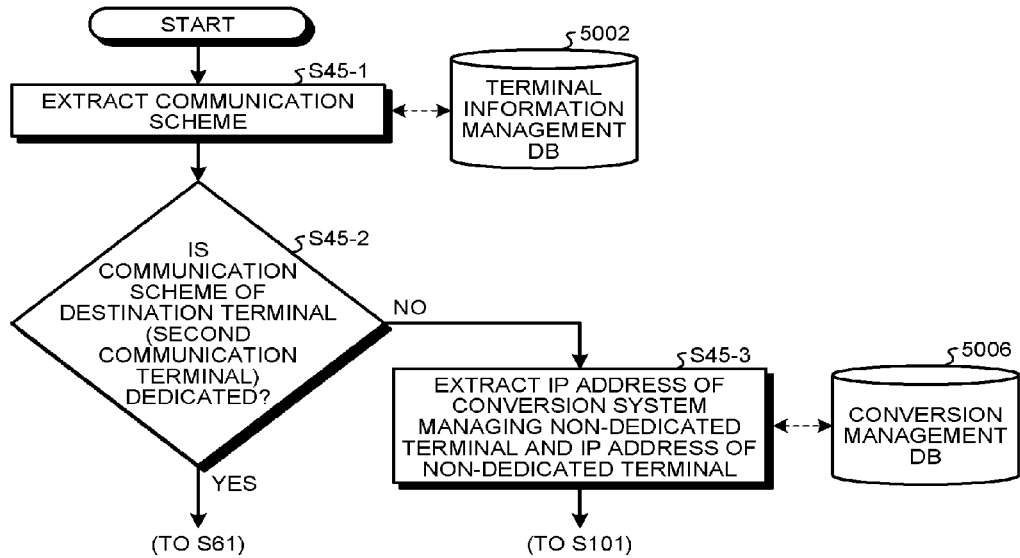
FIG. 20 is a flowchart illustrating the determination on the communication scheme.

The processing performed at step S45 is described in further detail below with reference to FIG. 20. FIG. 20 is a flowchart illustrating the determination on the communication scheme.

As illustrated in FIG. 20, the storage-read processing unit 59 searches the terminal information management table (refer to FIG. 12) on the basis of the terminal ID "01ca" of the destination terminal (terminal 10ca) received by the transmitting-receiving unit 51, and extracts the communication scheme information corresponding to the terminal ID "01ca" (step S45-1).

The determination unit 55 determines whether the communication scheme indicated by the extracted communication scheme information is the communication scheme used by the requester terminal (terminal 10aa) serving as the dedicated terminal A (step S45-2). Specifically, the determination unit 55 determines whether the communication scheme indicated by the communication scheme information extracted by the storage-read processing unit 59 is the same as the communication scheme used by the requester terminal (terminal 10aa). In the case that the communication schemes are the same, both of the call control scheme and the coding scheme are the same whereas in the case that the communication schemes are not the same (different from each other), at least one of the call control scheme and the coding scheme differs from each other.

Figure 21:
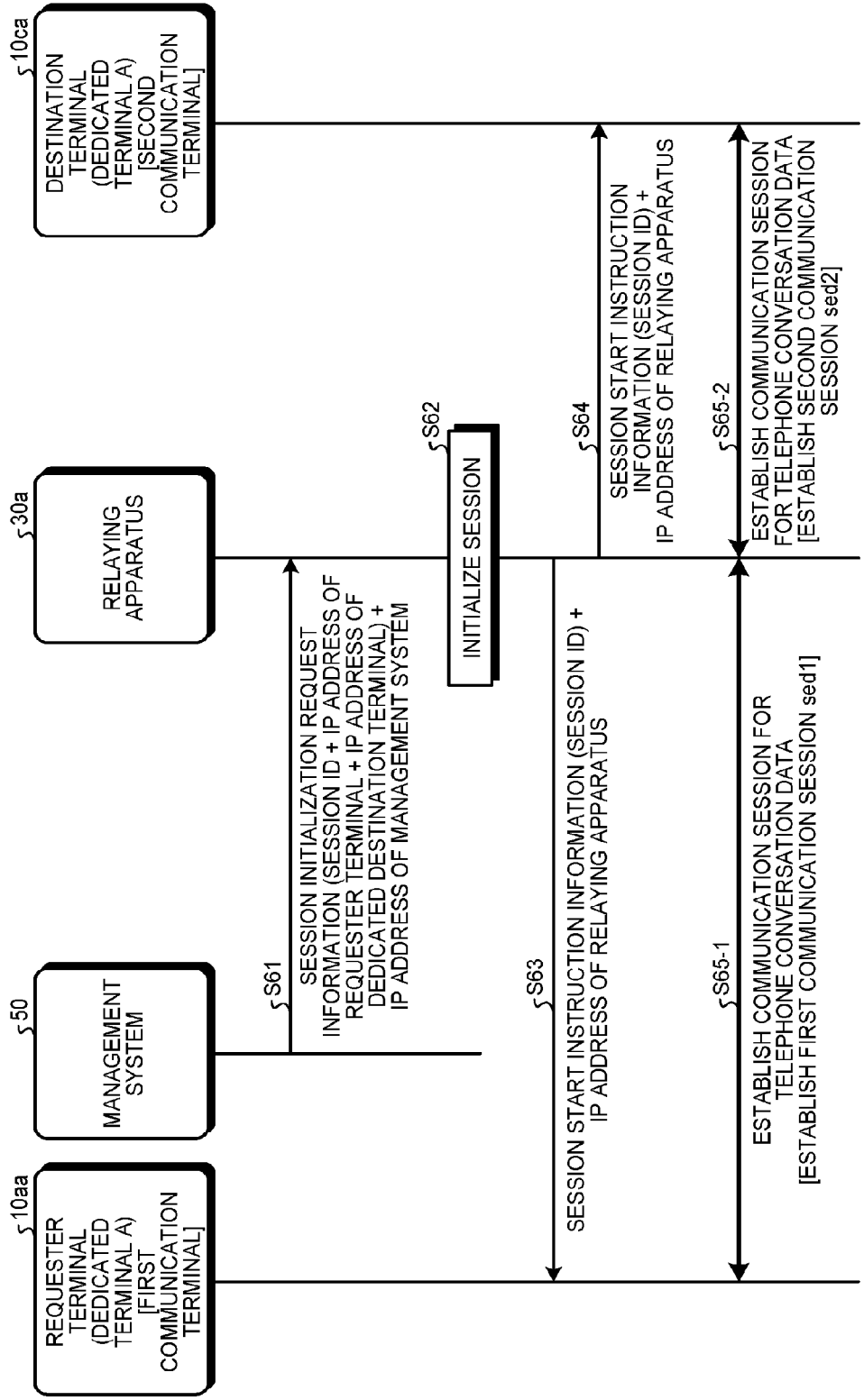
FIG. 21 is a sequence diagram illustrating processing to establish a communication session before the telephone conversation is made between two dedicated terminals.

If the determination unit 55 determines that the communication schemes are the same (Yes at step S45-2), the processing proceeds to step S61 illustrated in FIG. 21, which is described later. In this case, the destination terminal (terminal 10ca) is the dedicated terminal A, which is the same type as the requester terminal (terminal 10aa), and thus the following description is made from step S61. FIG. 21 is a sequence diagram illustrating processing to establish the communication session before the telephone conversation is made between two dedicated terminals A. In the embodiment, a case is described where the relaying apparatus 30a connected to the LAN 2a, to which the requester terminal (terminal 10aa) is connected, is used in the relaying apparatuses 30.

As illustrated in FIG. 21, the management system 50 transmits, to the relaying apparatus 30a from the transmitting-receiving unit 51, session initialization request information to initialize the communication session established by the relaying apparatus 30a (step S61). The session initialization request information includes the session ID produced at step S44, the respective IP addresses of the requester terminal (terminal 10aa) and the destination terminal (terminal 10ca) that are managed by the terminal state management table (refer to FIG. 13). When transmitting the session initialization request information to the relaying apparatus 30a, the management system 50 transmits also the IP address of the management system 50. As a result, the transmitting-receiving unit 31 of the relaying apparatus 30a receives the session initialization request information and the IP address of the management system 50.

The transmitting-receiving unit 31 of the relaying apparatus 30a initializes the communication session (step S62). The transmitting-receiving unit 31 transmits, to the requester terminal (terminal 10aa), the session start instruction information indicating the instruction to start the communication session (step S63). The session start instruction information includes the session ID transmitted from the management system 50. When transmitting the session start instruction information to the requester terminal (terminal 10aa), the relaying apparatus 30a transmits also the IP address of the relaying apparatus 30a. As a result, the transmitting-receiving unit 11 of the requester terminal (terminal 10aa) receives the session start instruction information and the IP address of the relaying apparatus 30a.

In the same manner, the transmitting-receiving unit 31 transmits, to the destination terminal (terminal 10ca), the session start instruction information indicating the instruction to start the communication session (step S64). The session start instruction information includes the session ID transmitted from the management system 50. When transmitting the session start instruction information to the destination terminal (terminal 10ca), the relaying apparatus 30a transmits also the IP address of the relaying apparatus 30a. As a result, the transmitting-receiving unit 11 of the destination terminal (terminal 10ca) receives the session start instruction information and the IP address of the relaying apparatus 30a.

As a result of the processing at step S63, the communication session (the first communication session sed1 illustrated in FIG. 2) to transmit and receive telephone conversation data is established between the requester terminal (terminal 10*aa*) and the relaying apparatus 30*a* (step S65-1). As a result of the processing at step S64, the communication session (the second communication session sed2 illustrated in FIG. 2) to transmit and receive telephone conversation data is established between the relaying apparatus 30*a* and the destination terminal (terminal 10*ca*) (step S65-2).

Figure 22:
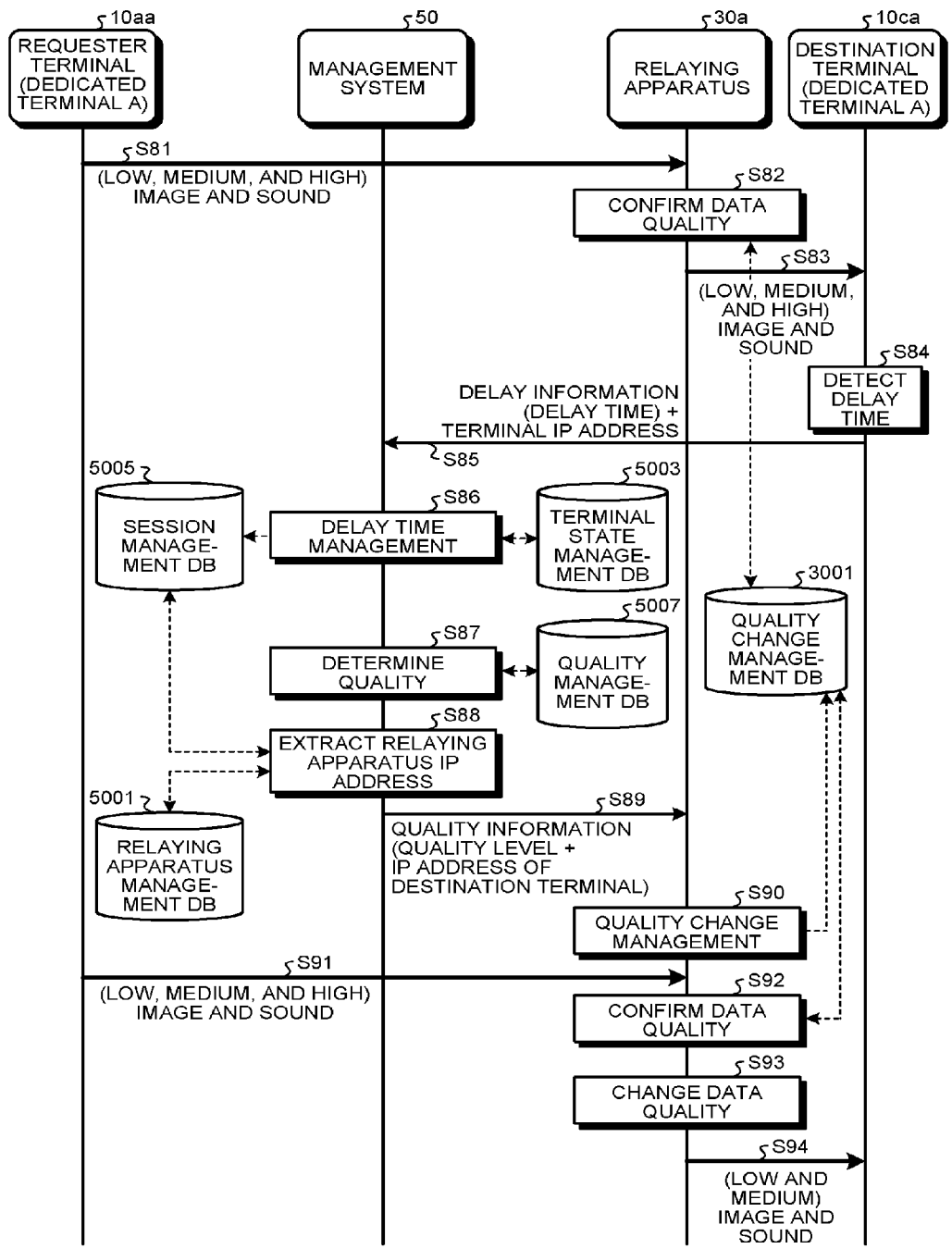
FIG. 22 is a sequence diagram illustrating processing in which telephone conversation data is transmitted and received between two dedicated terminals.

The following describes processing to transmit and receive telephone conversation data for a telephone conversation such as a teleconference between the requester terminal and the destination terminal with reference to FIG. 22. FIG. 22 is a sequence diagram illustrating processing in which telephone conversation data is transmitted and received between the two dedicated terminals A. The transmitting and receiving the telephone conversation data and detection of the delay time, which is described later, are processed in the same manner both in the processing for transmitting the telephone conversation data from the terminal 10*aa* to the terminal 10*ca* in one direction and in the processing for transmitting the telephone conversation data from the terminal 10*ca* to the terminal 10*a* in the opposite direction. Thus, the communication in the one direction is described while the description of the communication in the opposite direction is omitted.

The requester terminal (terminal 10*aa*) transmits image data of a subject imaged by the image capturing unit 14, and sound data of a sound received by the sound input unit 15*a* to the relaying apparatus 30*a* from the transmitting-receiving unit 11 through the communication network 2 using the communication session sed1 (step S81). In the embodiment, high image quality image data composed of three pieces of image data of low resolution, medium resolution, and high resolution illustrated in FIG. 3 and sound data are transmitted. As a result, in the relaying apparatus 30*a*, the transmitting-receiving unit 31 receives the image data composed of three pieces of different resolution image data and the sound data. The data quality confirmation unit 33 searches the quality change management table (refer to FIG. 10) using the IP address "1.3.1.3" of the destination terminal (terminal 10*ca*) as a searching key, extracts the image quality, which corresponds to the IP address, of the image data to be relayed, and confirms the image quality of the image data to be relayed (step S82). In the embodiment, the confirmed image quality of the image data is "high image quality", which is the same as that of the image data received by the transmitting-receiving unit 31. Thus, the relaying apparatus 30*a* transmits the image data and the sound data to the destination terminal (terminal 10*ca*) without any change in quality using the communication session sed2 (step S83). As a result, the transmitting-receiving unit 11 of the destination terminal (terminal 10*ca*) receives the high image quality image data composed of three pieces of image data of low resolution, medium resolution, and high resolution, and the sound data. The display control unit 16 can combine the three pieces of image data having different resolutions, causing the display 120 to display the resulting image and causing the sound output unit 15*b* to output a sound based on the sound data.

The delay detection unit 17 of the destination terminal (terminal 10*ca*) detects the delay time in receiving of image data received by the transmitting-receiving unit 11 at a regular time intervals (e.g., every one second) (step S84). In the embodiment, the following description is made on a case where the delay time is 200 (ms).

The transmitting-receiving unit 11 of the destination terminal (terminal 10*ca*) transmits the delay time information indicating the delay time "200 (ms)" to the management system 50 through the communication network 2 using the management communication session sei illustrated in FIG. 2 (step S85). As a result, the management system 50 can grasp the delay time and the IP address "1.3.1.3" of the terminal 10*ca* serving as the sender of the delay time information.

The delay time management unit 58 of the management system 50 searches the terminal state management table (refer to FIG. 13) using the IP address "1.3.1.3" of the destination terminal (terminal 10*ca*) as a searching key, and extracts the terminal ID "01ca" corresponding to the IP address. In addition, the delay time management unit 58 stores the delay time "200 (ms)" indicated by the delay time information in the field of the delay time of the record of the terminal ID "01ca" in the session management table (refer to FIG. 15) and manages it (step S86).

The quality determination unit 57 searches the quality management table (refer to FIG. 17) using the delay time "200 (ms)" as a searching key, extracts the image quality "medium image quality" of the image data corresponding to the delay time, and determines the image quality as the "medium image quality" (step S87).

The transmitting-receiving unit 51 searches the relaying apparatus management table (refer to FIG. 11) using the relaying apparatus ID "111a" associated with the terminal ID "01ca" in the session management table (refer to FIG. 15) as a searching key, and extracts the IP address "1.2.1.2" of the relaying apparatus 30*a* corresponding to the relaying apparatus ID (step S88). The transmitting-receiving unit 51 transmits the quality information indicating the image quality "medium image quality" of the image data determined at step S87 to the relaying apparatus 30*a* through the communication network 2 using the management communication session sei (step S89). The quality information includes the IP address "1.3.1.3" of the destination terminal (terminal 10*ca*) used as the searching key at step S86. As a result, the quality change management unit 34 of the relaying apparatus 30*a* stores, in the quality change management table (refer to FIG. 10), the IP address "1.3.1.3" of the terminal 10 serving as the transmission destination (in this case, the terminal 10*ca*) and the image quality "medium image quality" of the image data to be relayed in association with each other, and manages them (step S90).

The requester terminal (terminal 10*aa*) transmits the high image quality image data composed of three pieces of image data of low resolution, medium resolution, and high resolution and the sound data to the relaying apparatus 30*a* using the first communication session sed1 in the same manner as step S81 (step S91). As a result, the data quality confirmation unit 33 of the relaying apparatus 30 searches the quality change management table (refer to FIG. 10) using the IP address "1.3.1.3" of the destination terminal (terminal 10*ca*) as a searching key, extracts the image quality "medium image quality", which corresponds to the IP address, of the image data to be relayed, and confirms the image quality of the image data to be relayed in the same manner as step S82 (step S92). In the embodiment, the confirmed image quality of the image data is "medium image quality", which is lower than the image quality "high image quality" of the image data received by the transmitting-receiving unit 31. Thus, the data quality change unit 35 changes the image quality of the image data by decreasing the level of the image quality of the image data from "high image quality" to "medium image quality" (step S93).

The transmitting-receiving unit 31 transmits the image data the image quality of which has been changed to "medium image quality" and the sound data the sound quality of which has not been changed to the destination terminal (terminal 10*ca*) through the communication network 2 using the second communication session sed2 (step S94). As a result, the transmitting-receiving unit 11 of the destination terminal (terminal 10ca) receives the medium image quality image data composed of two pieces of image data of low resolution and medium resolution, and the sound data. The display control unit 16 can combine the two pieces of image data having different resolutions, causing the display 120ca to display the resulting image and causing the sound output unit 15b to output a sound based on the sound data.

In this way, when delay in receiving occurs at the destination terminal (terminal 10ca) that receives image data, the relaying apparatus 30a changes the image quality such that the users participating in the telephone conversation, such as a teleconference, do not feel uncomfortable with the image. The two dedicated terminals A can enjoy services for coping with the delay in receiving of image data.

The following describe the second communication pattern in which a telephone conversation is made between the dedicated terminal A (an example of the first communication terminal) and the non-dedicated terminal D (an example of the second communication terminal) with reference to FIGS. 20, 23, 24, and 25A to 25C. Specifically, a telephone conversation is made between the terminal 10aa serving as the dedicated terminal A and the terminal 10da serving as the non-dedicated terminal D. In the embodiment, the description is made on the following case. In the communication scheme used by the terminal 10aa, the call control scheme is the protocol of the instant messenger (or the extended version of the protocol of the instant messenger) and the coding scheme is SVC. In the communication scheme used by the terminal 10da, the call control scheme is SIP and the coding scheme is AVC.

In the second communication pattern, the selection of the destination at step S41 differs from the first communication pattern in that the terminal 10da is selected as the destination terminal instead of the terminal 10ca, and the terminal ID used for transmission, receiving and searching in accordance with the change only differs from that in the first communication pattern. The description thereof is thus omitted. The following description is made on a case where the determination unit 55 determines that the communication schemes are not the same (differ from each other), i.e., No at step S45-2 illustrated in FIG. 20.

In the second communication pattern, the storage-read processing unit 59 searches the conversion management table (refer to FIG. 16) on the basis of the terminal ID "01da" of the destination terminal (terminal 10da) received by the transmitting-receiving unit 51, and extracts the IP address "1.3.2.2" of the conversion system 80 and the IP address "1.3.2.3" of the destination terminal (terminal 10da) that correspond to the terminal ID "01da" (step S45-3). The processing then proceeds to step S101 illustrated in FIG. 23, which is described below.

FIG. 23 is a sequence diagram illustrating processing to establish the communication session before a telephone conversation is made between the dedicated terminal A and the non-dedicated terminal D. As illustrated in FIG. 23, the management system 50 transmits, to the relaying apparatus 30a from the transmitting-receiving unit 51, the session initialization request information to initialize the communication session established by the relaying apparatus 30a (step S101). The session initialization request information includes the session ID and the respective IP addresses of the requester terminal (terminal 10aa), the conversion system 80, and the destination terminal (terminal 10da). The session ID is produced at step S44. The IP address of the requester terminal (terminal 10aa) is managed by the terminal state management table (refer to FIG. 13). The respective IP addresses of the conversion system 80 and the destination terminal (terminal 10da) are extracted at step S45-3.

When transmitting the session initialization request information to the relaying apparatus 30a, the management system 50 transmits also the IP address of the management system 50. As a result, the transmitting-receiving unit 31 of the relaying apparatus 30a receives the session initialization request information and the IP address of the management system 50.

The transmitting-receiving unit 31 of the relaying apparatus 30a initializes the communication session (step S102). The transmitting-receiving unit 31 transmits, to the requester terminal (terminal 10aa), the session start instruction information indicating the instruction to start the communication session (step S103). The session start instruction information includes the session ID transmitted from the management system 50. When transmitting the session start instruction information to the requester terminal (terminal 10aa), the relaying apparatus 30a transmits also the IP address of the relaying apparatus 30a. As a result, the transmitting-receiving unit 11 of the requester terminal (terminal 10aa) receives the session start instruction information and the IP address of the relaying apparatus 30a.

In the same manner, the transmitting-receiving unit 31 transmits, to the conversion system 80, the session start instruction information indicating the instruction to start the communication session (step S104). The session start instruction information includes the session ID and the IP address of the destination terminal (terminal 10da) that are transmitted from the management system 50. The transmitting-receiving unit 31 thus transmits the session start instruction information and the IP address of the destination terminal (terminal 10da). When transmitting the session start instruction information to the conversion system 80, the relaying apparatus 30a transmits also the IP address of the relaying apparatus 30a. As a result, the transmitting-receiving unit 81 of the conversion system 80 receives the session start instruction information and the IP address of the relaying apparatus 30a.

In the second communication pattern, the transmitting-receiving unit 81 of the conversion system 80 transmits, to the destination terminal (terminal 10da), the session start instruction information indicating the instruction to start the communication session (step S105). The session start instruction information includes the session ID transmitted from the management system 50. When transmitting the session start instruction information to the destination terminal (terminal 10da), the conversion system 80 transmits also the IP address of the conversion system 80. As a result, the transmitting-receiving unit 11 of the destination terminal (terminal 10da) receives the session start instruction information and the IP address of the conversion system 80.

As a result of the processing at step S103, the communication session (the first communication session sed11 illustrated in FIG. 4) to transmit and receive telephone conversation data is established between the requester terminal (terminal 10aa) and the relaying apparatus 30a (step S106-1). As a result of the processing at step S104, the communication session (the second communication session sed12 illustrated in FIG. 4) to transmit and receive telephone conversation data is established between the relaying apparatus 30a and the conversion system 80 (step S106-2). As a result of the processing at step S105, the communication session (the third communication session sed13 illustrated in FIG. 4) to transmit and receive telephone conversation data is established between the conversion system 80 and the destination terminal (terminal 10da) (step S106-3).

The following describes processing to transmit and receive telephone conversation data for a telephone conversation such a teleconference, for example, between the requester terminal and the destination terminal with reference to FIG. 24. FIG. 24 is a sequence diagram illustrating processing in which telephone conversation data is transmitted and received between the dedicated terminal A and the non-dedicated terminal D.

The requester terminal (terminal 10aa) transmits image data of a subject imaged by the image capturing unit 14, and sound data of a sound received by the sound input unit 15a to the relaying apparatus 30a from the transmitting-receiving unit 11 through the communication network 2 using the communication session sed11 (step S121). In the second communication pattern, the high image quality image data composed of three pieces of image data of low resolution, medium resolution, and high resolution illustrated in FIG. 3 and the sound data are transmitted in the same manner as the first communication pattern. As a result, in the relaying apparatus 30a, the transmitting-receiving unit 31 receives the image data composed of three pieces of different resolution image data and the sound data.

The relaying apparatus 30a transmits the high quality image data composed of the three pieces of image data and the sound data to the conversion system 80 from the transmitting-receiving unit 31 through the communication network 2 using the communication session sed12 (step S122). As a result, in the conversion system 80, the transmitting-receiving unit 81 receives the image data composed of three pieces of different resolution image data and the sound data.

The communication scheme conversion unit 82 of the conversion system 80 converts the image data composed of three pieces of different resolution image data from the communication scheme used by the requester terminal (terminal 10aa) into that used by the destination terminal (terminal 10da) on the basis of the conversion rule preliminarily stored in the storage unit 8000 (step S123). With the conversion of the communication scheme, the image data composed of three pieces of different resolution image data (high resolution, medium resolution, and low resolution data) illustrated in FIG. 3 is converted into the image data of a single resolution (medium resolution) illustrated in FIG. 5.

The conversion system 80 transmits the sound data and the medium resolution image data to the terminal 10da from the transmitting-receiving unit 81 through the communication network 2 using the communication session sed13 (step S124). As a result, the transmitting-receiving unit 11 of the destination terminal (terminal 10da) receives the sound data and the medium resolution image data.

As illustrated in FIG. 24, when the destination terminal (terminal 10da) transmits image data and sound data to the requester terminal (terminal 10aa), the destination terminal (terminal 10da) transmits the sound data and the medium resolution image data to the conversion system 80 from the transmitting-receiving unit 11 through the communication network 2 using the communication session sed13 (step S125). As a result, the transmitting-receiving unit 81 of the conversion system 80 receives the sound data and the medium resolution image data.

The communication scheme conversion unit 82 of the conversion system 80 converts the sound data and the medium resolution image data from the communication scheme used by the destination terminal (terminal 10da) to that used by the requester terminal (terminal 10aa) on the basis of the conversion rule preliminarily stored in the storage unit 8000 (step S126).

Figure 25A:
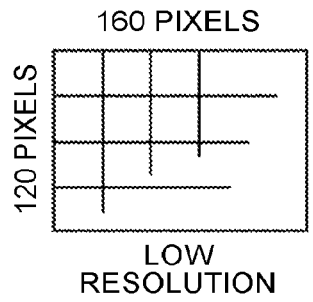
FIGS. 25A to 25C are conceptual diagrams illustrating the image quality of the image data having been converted by the conversion system.
Figure 25B:
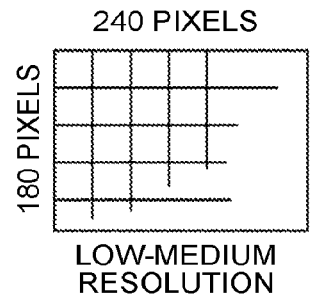
Figure 25C:
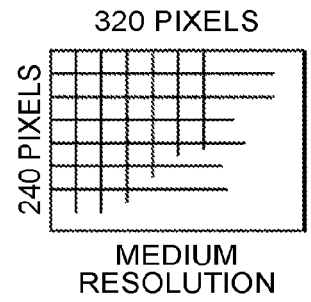

FIGS. 25A to 25C are conceptual diagrams illustrating the image quality of the image data having been converted by the conversion system. At step S126, the image data of a single resolution (medium resolution) illustrated in FIG. 5 is converted into the low resolution image data illustrated in FIG. 25A, the medium resolution image data illustrated in FIG. 25C, and the low-medium resolution image data, which resolution is a medium between the medium resolution and the low resolution, illustrated in FIG. 25B. Because the medium resolution image data is transmitted from the destination terminal (terminal 10da) serving as the non-dedicated terminal D, the conversion system 80 cannot convert the received medium resolution image data into image data having a resolution as high as that of the image data received at step S122. The conversion system 80 thus converts the received medium resolution image data into the medium resolution image data, which is the highest resolution, the low-medium resolution image data, and the low resolution image data.

The conversion system 80 transmits the sound data and the image data composed of the three different resolution image data to the relaying apparatus 30a from the transmitting-receiving unit 81 through the communication network 2 using the communication session sed12 (step S127). As a result, in the relaying apparatus 30a, the transmitting-receiving unit 31 receives the sound data and the image data composed of three pieces of different resolution image data. The relaying apparatus 30a transmits the sound data and the image data composed of three pieces of different resolution image data to the requester terminal (terminal 10aa) from the transmitting-receiving unit 31 through the communication network 2 using the communication session sed11 (step S128). As a result, in the requester terminal (terminal 10aa), the transmitting-receiving unit 11 receives the sound data and the image data composed of three pieces of different resolution image data.

Figure 26:
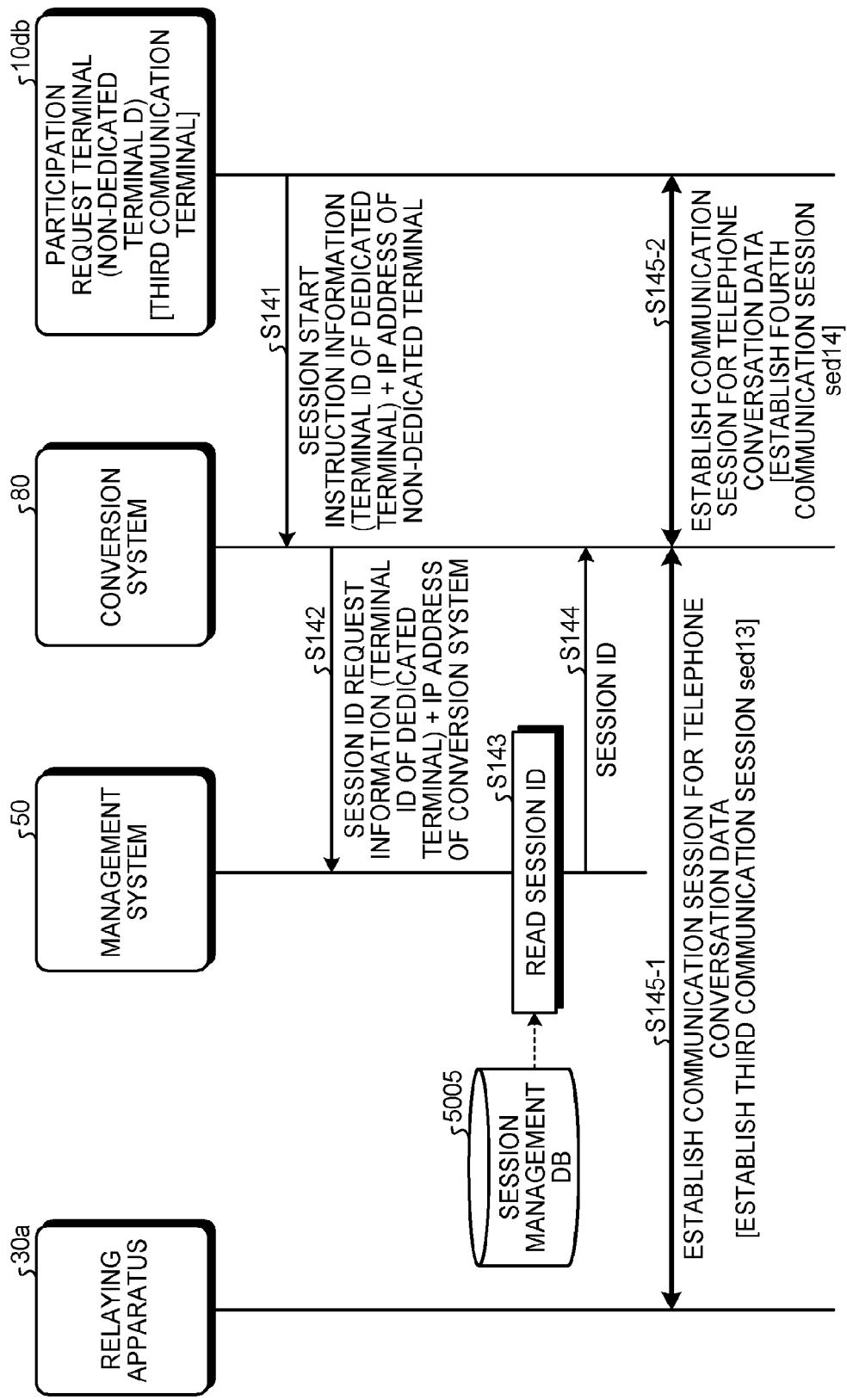
FIG. 26 is a sequence diagram illustrating processing of causing a non-dedicated terminal to join a telephone conversation.

The following describes a third communication pattern in which when a telephone conversation is made between the dedicated terminal A (an example of the first communication terminal) and the dedicated terminal A (an example of the second communication terminal) and they are talking with teach other as illustrated in FIG. 21, another non-dedicated terminal D joins the telephone conversation as a participation request terminal. FIG. 26 is a sequence diagram illustrating processing of causing the non-dedicated terminal to join the telephone conversation. In this case, the participation request terminal is the terminal 10db.

As illustrated in FIG. 26, the transmitting-receiving unit 11 of the participation request terminal (terminal 10db) transmits, to the conversion system 80, the session start instruction information indicating the instruction to start the communication session (step S141). As a result, the transmitting-receiving unit 81 of the conversion system 80 receives the session start instruction information and the IP address of the non-dedicated terminal D serving as the participation request terminal. The session start instruction information includes the terminal ID "01aa" of the dedicated terminal A (in this case, the terminal 10aa) as a target terminal with which the participation request terminal (terminal 10db) tries to make a communication. The terminal ID "01aa" is input or set to the participation request terminal (terminal 10db) by a user of the participation request terminal (terminal 10db).

The transmitting-receiving unit 81 of the conversion system 80 transmits, to the management system 50, session ID request information indicating a request for the session ID of the communication session (step S142). As a result, the transmitting-receiving unit 51 of the management system 50 receives the session ID request information and the IP address of the conversion system 80. The session ID request information includes the terminal ID "01aa" received at step S141.

The storage-read processing unit 59 of the management system 50 searches the session management table (refer to FIG. 15) using the terminal ID "01aa" received at step S142 as a searching key, and reads the session ID "se01" that identifies the communication session in which the terminal 10aa indicated by the terminal ID "01aa" is busy (step S143).

The transmitting-receiving unit 51 of the management system 50 transmits, to the conversion system 80, the session ID obtained by the processing at step S143 (step S144). As a result, the transmitting-receiving unit 81 of the conversion system 80 receives the session ID. The transmitting-receiving unit 81 of the conversion system 80 establishes the third communication session sed13 to transmit and receive telephone conversation data between itself and the relaying apparatus 30a using the session ID received at step S144 (step S145-1). In the same manner, the transmitting-receiving unit 81 establishes a fourth communication session sed14 to transmit and receive telephone conversation data between itself and the participation request terminal (terminal 10db) (step S145-2). As a result, the participation request terminal can also join the telephone conversation even if the participation request terminal is the non-dedicated terminal D.

Advantages of Embodiment

As described above in the embodiment, by using a terminal ID of a target terminal (the dedicated terminal A), which is received from a participation request terminal (the non-dedicated terminal D) through the conversion system 80, the management system 50 reads a session ID indicating that the target terminal is busy, (refer to step S143) and transmits the session ID to the conversion system 80 (refer to step S144). With this configuration, even if the communication scheme used by a communication terminal that is having a communication is different from the communication scheme used by a communication terminal trying to join the communication, the communication terminal trying to join the communication can easily join the communication.

The session initialization request information transmitted to the relaying apparatus 30a from the management system 50 includes the IP address of each of the requester terminal, the conversion system 80, and the destination terminal. As a result, the relaying apparatus 30a can transmit the session start instruction information to the IP address of the requester terminal and transmit the session start instruction information including the IP address of the destination terminal to the IP address of the conversion system 80. Consequently, the conversion system 80 can transmit the session start instruction information to the IP address of the destination terminal.

The session initialization request information transmitted by the management system 50 as described above enables the first communication session sed11 to be established between the relaying apparatus 30 and the requester terminal, the second communication session sed12 to be established between the relaying apparatus 30 and the conversion system 80, and the third communication session sed13 to be established between the conversion system 80 and the destination terminal. The embodiment thus has an advantage of enabling a telephone conversation to be achieved even if the requester terminal and the destination terminal use different communication schemes because the conversion system 80 mutually converts the communication schemes of the telephone conversation data.

Additional Explanation of Embodiment

In the embodiment, the requester terminal or the dedicated terminal A is described as an example of the first communication terminal while the destination terminal or the non-dedicated terminal D is described as an example of the second communication terminal. The examples, however, are not limited to those. The destination terminal or the non-dedicated terminal D may be an example of the first communication terminal while the requester terminal or the dedicated terminal A may be an example of the second communication terminal.

In the embodiment, the third communication pattern is described as a case where a participation request is made when a telephone conversation is made between the dedicated terminals A (in the first communication pattern) as illustrated in FIG. 21. The participation request, however, may also be made when a telephone conversation is made between the dedicated terminal A and the non-dedicated terminal D (in the second communication pattern) as illustrated in FIG. 23.

The telephone conversation data is an example of the communication data. Examples of the communication data include file data of text and images. The telephone conversation terminal 10 is an example of the communication terminal. Examples of the communication terminal include an information processing terminal that transmits and receives the file data in addition to the terminal that performs a telephone conversation. The telephone conversation management system 50 is an example of a communication management system. Examples of the communication management system include a file management system that manages processing on the file data in addition to the system that manages telephone conversations. The telephone conversation system 1 is an example of a communication system. The communication system includes the communication terminal and the communication management system.

In the embodiment, the management system 50 manages the communication scheme information using the terminal information management table (refer to FIG. 12). The management manner, however, is not limited to this example. The requester terminal may manage the communication scheme information of the destination terminal.

This structure enables the requester terminal (terminal 10aa) to transmit, to the management system 50, the communication scheme information by including it in the start request information together with the terminal IDs of the requester terminal and the destination terminal at step S42 illustrated in FIG. 19. In this case, at step S41 of FIG. 19, the display control unit 16 may cause the display 120 to display a selection screen for selecting the non-dedicated terminal serving as the destination of a telephone conversation and prompt a user to select the destination.

When the destination is selected from the selection screen, the requester terminal (terminal 10aa) transmits, to the management system, the start request information that includes the information (communication scheme information) indicating that the destination terminal ID is associated with the non-dedicated terminal at step S42 of FIG. 19. In this case, the management system 50 does not need to perform the processing at step S45-1 of FIG. 20. The management system 50 determines that the communication scheme used by the destination terminal is not the dedicated one on the basis of the communication scheme information included in the start request information (No at step S45-2 of FIG. 20), and then the processing proceeds to step S45-3 of FIG. 20.

A user is not always required to select the destination from the selection screen. For example, when a user already grasps position information about the destination terminal, the user may input the position information (e.g., the IP address) about the destination terminal to the operation input reception unit 12. In this case, the requester terminal transmits, to the management system 50 at step S42, the start request information that includes the position information about the destination terminal and the information (communication scheme information) indicating that the destination terminal is the non-dedicated terminal, instead of the terminal ID of the destination terminal. In the management system 50, the determination unit 55 determines, at step S45-2, that the destination terminal indicated by the position information is not the dedicated terminal, and then the processing proceeds to the processing at step S45-3. At step S45-3, the storage-read processing unit 59 extracts the position information about the conversion system 80 on the basis of the position information about the non-dedicated terminal, and then the processing proceeds to the processing at step S101.

The terminal ID may be preliminarily stored in the terminal 10 as the factory setting, for example, or may be input by a user.

The relaying apparatus 30, the management system 50, the conversion system 80, the program supply system 90, and the maintenance system 100 in the embodiment may be structured by a single computer. The units (function or operations) of them may be divided and the divided units may be structured by a plurality of computers each allocated for any unit. When the program supply system 90 is structured by a single computer, a program transmitted by the program supply system 90 may be transmitted as a plurality of divided modules or transmitted without being divided. When the program supply system 90 is structured by a plurality of computers, a program may be transmitted from the computers as a plurality of divided modules.

In the embodiment, the protocol of the instant messenger (or the extended version of the protocol of the instant messenger) and SIP are described as an example used in a case where the call control schemes differ between the terminals. The combination of the call control schemes is not limited to this example, and any combination is applicable as long as the call control schemes differ between the terminals. For example, a combination of the protocol of the instant messenger (or the extended version of the protocol of the instant messenger) and H.323 may be applicable. For another example, a combination of the protocol of the instant messenger and the extended version of the protocol of the instant messenger may also be applicable.

The recording medium, such as a CD-ROM, that stores therein the respective programs of the embodiment, the HD 204 that stores therein the programs, and the program supply system 90 including the HD 204 can be provided as program products domestically or overseas.

In the embodiment, as an example of the quality of an image of the image data relayed by the relaying apparatus 30, attention is paid to the resolution of the image of the image data and the resolution is managed by the quality change management table illustrated in FIG. 10 and the quality management table illustrated in FIG. 17. The image quality is not limited to the resolution. As other examples of the quality, attention may be paid to a depth of image quality of the image data, a sampling frequency of a sound in the sound data, and a bit length of a sound in the sound data, and the quality may be managed. Sound data may be transmitted and received by being divided with respect to three pieces of data having different resolutions (high resolution, medium resolution, and low resolution).

In FIGS. 11, 13, and 15, the receiving date is managed. The management item is not limited to the receiving date. At least receiving time may be managed in the receiving date.

In the embodiment, the IP address of the relaying apparatus 30 is managed in FIG. 11 while the IP address of the terminal 10 is managed in FIG. 13. The management item, however, is not limited to the IP address. Each fully qualified domain name (FQDN) of the relaying apparatus 30 and the terminal 10 may be managed as the position information for identifying the relaying apparatus 30 on the communication network 2 or the position information for identifying the terminal 10 on the communication network 2. In this case, the IP address corresponding to the FQDN is acquired by a known domain name system (DNS) server.

In the embodiments, the teleconference system is described as an example of the telephone conversation system 1. The telephone conversation system 1, however, is not limited to be applied to the teleconference system. The telephone conversation system 1 may be applicable to a telephone system such as an Internet protocol (IP) telephone and an Internet telephone. The telephone conversation system 1 may be a car navigation system. In this case, one terminal 10 corresponds to a car navigation system mounted on a vehicle while the other terminal 10 corresponds to a management terminal or a management server of a management center that manages the car navigation or another car navigation system mounted on another vehicle. The telephone conversation system 1 may be a communication system of mobile phones. In this case, the terminal 10 corresponds to the mobile phone, for example.

In the embodiment, image data and sound data are described as examples of the telephone conversation data. The data, however, is not limited to the image data and the sound data. Touch data may be applicable. In this case, a sense of touch obtained by a user at one terminal is transmitted to the other terminal through a telephone conversation. The telephone conversation data may be olfaction (smell) data. In this case, an aroma (smell) at one terminal is transmitted to the other terminal through a telephone conversation. The telephone conversation data may be at least one piece of image data, sound data, touch data, and olfaction data.

In the embodiment, the teleconference is held using the telephone conversation system 1. The telephone conversation system 1, however, is not limited to be used for the teleconference. The telephone conversation system 1 may be used for meetings, general conversations among family members or friends or information supply in one direction.

The communication management system according to an aspect of the invention receives terminal identifying information about a communication terminal that is having a communication from a conversion system, which mutually converts a communication scheme of communication data transmitted from one communication terminal and another communication scheme of communication data transmitted from another communication terminal. The communication management system then transmits session identifying information that is associated with the received terminal identifying information to the conversion system. With this configuration, even if the communication scheme of a communication terminal trying to join a communication is different from the communication scheme of a plurality of communication terminals that is having the communication, the communication terminal trying to join the communication can join the communication.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone)

and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system comprising:
   a memory configured to store session identification information for identifying a session that is established between a first communication terminal and a second communication terminal based on a first communication method through a relaying apparatus and identification information of the first communication terminal and the second communication terminal in association with each other, the first communication terminal or the second communication terminal being configured to transmit communication data based on the first communication method;
   a receiver configured to receive session start instruction information for instructing a start of a session from a third communication terminal that transmits communication data to another communication terminal based on a second communication method different from the first communication method while the communication data is transmitted using the session established between the first communication terminal and the second communication terminal based on the first communication method through the relaying apparatus, the session start instruction information including at least the identification information of the first communication terminal without including the session identification information; and
   processing circuitry configured to identify session identification information for identifying a session being established between the first communication terminal and the second communication terminal based on the identification information of the first communication terminal included in the session start instruction information, the session identification information being associated with the identification information of the first communication terminal stored in the memory, wherein
   the third communication terminal that transmits the communication data based on the second communication method is allowed to join the session being established between the first communication terminal and the second communication terminal through the relaying apparatus and a conversion system that mutually converts the first communication method and the second communication method, based on the session identification information identified by the processing circuitry.

2. The system according to claim 1, wherein the identification information of the first communication terminal included in the session start instruction information received from the third communication terminal is information input to the third communication terminal by a user of the third communication terminal.

3. The system according to claim 1, wherein the memory further stores operation states of the first communication terminal and the second communication terminal under the first communication method but does not store an operation state of the third communication terminal under the second communication method.

4. The system according to claim 1, wherein each of the first and second communication methods includes at least a session control protocol and a video coding method, and the first communication method differs from the second communication method in a type of the video coding method.

5. The system according to claim 4, wherein the video coding method included in the first communication method is H.264/scalable video coding, and the video coding method included in the second communication method is H.264/advanced video coding.

6. The system according to claim 1, further comprising:
   the conversion system that includes the receiver; and
   a management system that includes the processing circuitry, wherein
   the conversion system further includes a transmitter configured to transmit, to the management system, session identification information request information that indicates a request for the session identification information for identifying a session which the first communication terminal is joining in response to receiving the session start instruction information,
   the conversion system receives, through the receiver, the session identification information that is identified by the processing circuitry of the management system in response to receiving the session identification information request information, and
   the conversion system further allows the third communication terminal to join the session being established between the first communication terminal and the second communication terminal through not only the relaying apparatus but also the conversion system, based on the session identification information received by the receiver.

7. A method, implemented by a system, comprising:
   storing, by a memory, identification information for identifying a session that is established between a first communication terminal and a second communication terminal based on a first communication method through a relaying apparatus and identification information of the first communication terminal and the second communication terminal in association with each other, the first communication terminal or the second communication terminal being configured to transmit communication data based on the first communication method;
   receiving, by a receiver, session start instruction information for instructing a start of a session from a third communication terminal that transmits communication data to another communication terminal based on a second communication method different from the first communication method while the communication data is transmitted using the session established between the first communication terminal and the second communication terminal based on the first communication method through the relaying apparatus, the session start instruction information including at least the identification information of the first communication terminal without including any session identification information; and identifying, by processing circuitry, session identification information for identifying a session being established between the first communication terminal and the second communication terminal based on the identification information of the first communication terminal included in the session start instruction information, the session identification information being associated with the identification information of the first communication terminal stored in the memory, wherein the third communication terminal that transmits the communication data based on the second communication method is allowed to join the session being established between the first communication terminal and the second communication terminal through the relaying apparatus and a conversion system that mutually converts the first communication method and the second communication method, based on the session identification information identified by the processing circuitry.

8. The method according to claim 7, wherein the identification information of the first communication terminal included in the session start instruction information received from the third communication terminal is information input to the third communication terminal by a user of the third communication terminal.

9. The method according to claim 7, wherein the memory further stores operation states of the first communication terminal and the second communication terminal under the first communication method but does not store an operation state of the third communication terminal under the second communication method.

10. The method according to claim 7, wherein each of the first and second communication methods includes at least a session control protocol and a video coding method, and the first communication method differs from the second communication method in a type of the video coding method.

11. The method according to claim 10, wherein the video coding method included in the first communication method is H.264/scalable video coding, and the video coding method included in the second communication method is H.264/advanced video coding.

12. A communication management system comprising:
a memory configured to store session identification information for identifying a session that is established between a first communication terminal and a second communication terminal based on a first communication method through a relaying apparatus and identification information of the first communication terminal and the second communication terminal in association with each other, the first communication terminal or the second communication terminal being configured to transmit communication data based on the first communication method;
a receiver configured to receive the identification information of the first communication terminal, without including any session identification information, from a conversion system that mutually converts the first communication method and the second communication method while the communication data is transmitted using the session established between the first communication terminal and the second communication terminal based on the first communication method through the relaying apparatus, the identification information to be received being transmitted from a third communication terminal that transmits communication data to another communication terminal based on a second communication method different from the first communication method;
processing circuitry configured to identify session identification information for identifying a session being established between the first communication terminal and the second communication terminal based on the identification information of the first communication terminal received from the conversion system, the session identification information being associated with the identification information of the first communication terminal stored in the memory; and
a transmitter configured to transmit the identified session identification information to the conversion system so that the third communication terminal joins the session being established between the first communication terminal and the second communication terminal through the relaying apparatus and the conversion system.

13. The communication management system according to claim 12, wherein the identification information of the first communication terminal received from the conversion system is information input to the third communication terminal by a user of the third communication terminal.

14. The system according to claim 12, wherein the memory further stores operation states of the first communication terminal and the second communication terminal under the first communication method but does not store an operation state of the third communication terminal under the second communication method.

15. The system according to claim 12, wherein each of the first and second communication methods includes at least a session control protocol and a video coding method, and the first communication method differs from the second communication method in a type of the video coding method.

16. The system according to claim 15, wherein the video coding method included in the first communication method is H.264/scalable video coding, and the video coding method included in the second communication method is H.264/advanced video coding.

17. A method, implemented by a communication management system, comprising:
storying, by a memory, session identification information for identifying a session that is established between a first communication terminal and a second communication terminal based on a first communication method through a relaying apparatus and identification information of the first communication terminal and the second communication terminal in association with each other, the first communication terminal or the second communication terminal being configured to transmit communication data based on the first communication method;
receiving, by a receiver, the identification information of the first communication terminal, without including any session identification information, from a conversion system that mutually converts the first communication method and the second communication method while the communication data is transmitted using the session established between the first communication terminal and the second communication terminal based on the first communication method through the relaying apparatus, the identification information to be received being transmitted from a third communication terminal that transmits communication data to another communication terminal based on a second communication method different from the first communication method;

identifying, by processing circuitry, session identification information for identifying a session being established between the first communication terminal and the second communication terminal based on the identification information of the first communication terminal received from the conversion system, the session identification information being associated with the identification information of the first communication terminal stored in the memory; and transmitting, by a transmitter, the identified session identification information to the conversion system so that the third communication terminal joins the session being established between the first communication terminal and the second communication terminal through the relaying apparatus and the conversion system.

18. The method according to claim 17, wherein the identification information of the first communication terminal received from the conversion system is information input to the third communication terminal by a user of the third communication terminal.

19. The method according to claim 17, wherein the memory further stores operation states of the first communication terminal and the second communication terminal under the first communication method but does not store an operation state of the third communication terminal under the second communication method.

20. The method according to claim 17, wherein each of the first and second communication methods includes at least a session control protocol and a video coding method, and the first communication method differs from the second communication method in a type of the video coding method.

21. The method according to claim 20, wherein the video coding method included in the first communication method is H.264/scalable video coding, and the video coding method included in the second communication method is H.264/advanced video coding.

* * * * *